United States Patent
Nguyen et al.

(10) Patent No.: US 10,384,193 B2
(45) Date of Patent: Aug. 20, 2019

(54) NITROGEN AND PHOSPHOROUS DOPED CARBON SUPPORTED NANOPARTICLE PLATINUM ELECTROCATALYST AND METHOD OF MAKING

(71) Applicant: TDA Research, Inc, Wheat Ridge, CO (US)

(72) Inventors: Vinh The Nguyen, Westminster, CO (US); Steven Dietz, Englewood, CO (US); Steve Paglieri, Arvada, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 15/933,328

(22) Filed: Mar. 22, 2018

(65) Prior Publication Data

US 2018/0272320 A1    Sep. 27, 2018

Related U.S. Application Data

(60) Provisional application No. 62/474,773, filed on Mar. 22, 2017.

(51) Int. Cl.

| | |
|---|---|
| *B01J 23/42* | (2006.01) |
| *B01J 31/02* | (2006.01) |
| *B01J 21/18* | (2006.01) |
| *B01J 35/10* | (2006.01) |
| *B01J 35/00* | (2006.01) |
| *H01M 4/92* | (2006.01) |
| *B01D 67/00* | (2006.01) |
| *B01D 69/02* | (2006.01) |
| *B01D 69/06* | (2006.01) |
| *B01D 71/02* | (2006.01) |

(52) U.S. Cl.
CPC ........... *B01J 23/42* (2013.01); *B01D 67/0011* (2013.01); *B01D 67/0013* (2013.01); *B01D 67/0037* (2013.01); *B01D 67/0088* (2013.01); *B01D 67/0093* (2013.01); *B01D 69/02* (2013.01); *B01D 69/06* (2013.01); *B01D 71/021* (2013.01); *B01J 21/18* (2013.01); *B01J 31/0244* (2013.01); *B01J 31/0258* (2013.01); *B01J 35/006* (2013.01); *B01J 35/0033* (2013.01); *B01J 35/1028* (2013.01); *B01J 35/1038* (2013.01); *B01J 35/1057* (2013.01); *H01M 4/926* (2013.01); *B01D 2325/02* (2013.01); *B01D 2325/10* (2013.01)

(58) Field of Classification Search
None
See application file for complete search history.

(56) References Cited

PUBLICATIONS

Peng et al.; Low Pt Content Catalyst Supported on Nitrogen and Phosphorous-Codoped Carbon Nanotubes for Electrocatalytic O2 Reaction in Acidic Medium; Materials Letters; 142, 115-118; 2015.*
Dietz; WIPO Pub. No. 2017/172512; 2016.*

* cited by examiner

*Primary Examiner* — Guinever S Gregorio
(74) *Attorney, Agent, or Firm* — Brian J. Elliott

(57) ABSTRACT

A platinum-carbon electrocatalyst material comprising a carbon support having a minimum BET surface area of 1000 m²/g, a nitrogen content of at least 2.5 weight percent, which is present in the form of pyridine, pyridone or pyrrole, a phosphorous content of at least 3 weight percent, which is present in the form of phosphate and phosphonate, and a plurality of platinum nanoparticles dispersed on the carbon support having a maximum average particle diameter of 1.5 nm.

7 Claims, 32 Drawing Sheets

| Carbon Sample | BET Surface Area (m²/g) | Total Pore Vol. (cc/g) | Micropore Vol. (cc/g) | C (wt.%) | H (wt.%) | N (wt.%) | O (wt.%) | P (wt.%) |
|---|---|---|---|---|---|---|---|---|
| AC-1 | 1067 | 1.2 | 0.31 | 77.9 | 1.76 | 6.05 | 10.67 | 3.04 |
| AC-2 | 1452 | 0.75 | 0.44 | 81.17 | 1.24 | 2.72 | 10.25 | 3.70 |

Fig. 4

| Name | Binding Energy (eV) | FWHM | Area | Atom % |
|------|---------------------|------|--------|--------|
| C 1s | 284.4 | 3.168 | 3806.8 | 83.7 |
| N 1s | 400.8 | 4.385 | 359.1 | 4.6 |
| O 1s | 531.8 | 4.321 | 1265.5 | 9.9 |
| P 2p | 132.8 | 3.398 | 140.8 | 1.8 |

Fig. 7

| Name | Binding Energy (eV) | FWHM | Area | Atom % |
|---|---|---|---|---|
| C 1s | 284.4 | 3.253 | 13542.2 | 90.4 |
| N 1s | 400.4 | 4.717 | 265.7 | 1.0 |
| O 1s | 532.4 | 4.157 | 3205.4 | 7.6 |
| P 2p | 133.4 | 3.438 | 252.4 | 1.0 |

Fig. 8

| Membrane | Polymer (wt%) | HPA (wt%) | PA (wt%) | Water (wt%) | $n_{PA/PBI}$ (molar ratio) | Conductivity at 160°C, 10% RH (S/cm) |
|---|---|---|---|---|---|---|
| PBI/PA | 34.4 | 0.0 | 55.8 | 9.8 | 5.1 | 0.049 |
| PBI/10%HPA/PA | 32.1 | 3.2 | 55.0 | 9.7 | 5.4 | 0.094 |
| PBI/20%HPA/PA | 26.5 | 5.3 | 58.0 | 10.2 | 6.9 | 0.127 |

Fig. 31

ND PHOSPHOROUS DOPED
NITROGEN AND PHOSPHOROUS DOPED CARBON SUPPORTED NANOPARTICLE PLATINUM ELECTROCATALYST AND METHOD OF MAKING

CROSS REFERENCE TO RELATED APPLICATIONS

This Non-Provisional Application claims the benefit of U.S. Provisional Application No. 62/474,773, filed Mar. 22, 2017.

STATEMENT REGARDING FEDERALLY SPONSORED RESEARCH OR DEVELOPMENT

This invention was made using U.S. government funding through the U.S. Navy SYSCOM contract No. N00024-17-P-4509. The government has certain rights in this invention

BACKGROUND

Proton exchange membrane fuel cells (PEMFCs) can provide mobile and stationary power, but their adoption has been limited due to cost, low performance and inadequate durability. The membrane electrode assembly (MEA) is the heart of a PEMFC and it comprised of several components that affect the fuel cell's performance and efficiency. Among these components, the precious metal catalyst in the electrodes is a primary contributor to both the PEMFC's cost and its durability. PEMFC electrodes contain nanostructured platinum (Pt) dispersed on a porous activated-carbon support at ratios of about 10-60 wt. %. Because of its excellent electrical properties, good chemical and electrochemical stabilities, and high surface area, carbon black is typically used as a catalyst support. However, carbon black has limitations because its relatively inert surface interacts weakly with Pt nanoparticles, and thus they tend to migrate and agglomerate during fuel cell operation. In addition, the catalytic Pt nanoparticles can become trapped or isolated in the micropores of carbon black, making them electrochemically inaccessible.

During fuel cell operation, carbon black used as a catalyst support can corrode, forming oxygen containing functional groups on the surface that further weakens its interaction with platinum nanoparticles. The nanoparticles then detach from the support, which promotes both dissolution and agglomeration. Furthermore, carbon corrosion also decreases the catalyst layer thickness, lowers the electrical contact with the gas diffusion layer (GDL), and increases the fuel cell resistance. All of these consequences eventually result in loss of catalytic surface area, degradation of cell voltage, and reduction of fuel cell performance.

BRIEF SUMMARY OF THE INVENTION

To overcome the limitations of the prior art, the present invention provides a carbon-based catalyst support with a superior microporous/mesoporous structure, superior catalytic properties and superior durability that enable improved PEMFC performance and durability. To more tightly bind the Pt nanoparticles, the improved carbon supports used in the present invention have strong surface interactions with the Pt nanoparticles and this enhances both the catalytic activity and stability. The present invention also provides a method of making a platinum-carbon electrocatalyst with platinum nanoparticles that are only a maximum of 1.5 nm in average diameter and that are tightly anchored to the carbon support so that they have long-term durability and avoid the platinum migration and agglomeration problems that plague the examples in the prior art.

The present invention teaches that nitrogen-doped carbons (where the nitrogen is present in the form of pyridine, pyridine or pyrrole) provides both strong and beneficial catalyst support interactions, thus producing highly effective electrocatalyst. Compared to carbon black, nitrogen-doped carbons show more oxidation resistance. In addition, the nitrogen functional groups on the surface of the carbon enhance the strength of the bond with the Pt nanoparticles, which helps prevent coalescence and agglomeration. The resultant functionalization of the carbon surface with nitrogen containing groups then provides more anchoring sites to attach Pt, and therefore, increase its durability. Furthermore, nitrogen-doped activated carbons with high surface areas (>1000 $m^2 \cdot g^{-1}$) make the catalyst even more effective because it helps disperse the Pt nanoparticles more uniformly over the support. Homogeneously deposited Pt with a smaller crystallite size also significantly reduces the cost of the catalyst due to the lower Pt loading at the electrodes. Lastly, microporous/mesoporous nitrogen-doped carbon also has better diffusion pathways for fuel cell reactants and products.

The present invention also teaches that phosphorous-doped carbons (where the phosphorous is present in the form of phosphate or phosphonate) enhances the diffusion of water within the electrode material.

The present invention provides a platinum-carbon electrocatalyst material comprising a carbon support having a minimum BET surface area of 1000 $m^2/g$; a nitrogen content of at least 2.5 weight percent, which is present in the form of pyridine, pyridone or pyrrole; a phosphorous content of at least 3 weight percent, which is present in the form of phosphate and phosphonate; and a plurality of platinum nanoparticles dispersed on the carbon support having a maximum average particle diameter of 1.5 nm.

In additional embodiments, the platinum-carbon electrocatalyst material of claim 1 further comprising: a DFT micropore volume from 0.3 to 0.45. Alternatively, The platinum-carbon electrocatalyst material of claim 1 further comprising: pore widths from 1 to 100 nm. Optionally, the platinum-carbon electrocatalyst material of claim 3 further comprising: pore widths from 2 to 50 nm. Preferably, the platinum-carbon electrocatalyst material of claim 3 further comprising: pore widths in a range from 1 to 5 nm. In another embodiment, the platinum-carbon electrocatalyst material of claim 1 further comprising: a minimum BET surface area of 1400 $m^2/g$.

The present invention also provides a method of making a platinum-carbon electrocatalyst material comprising a carbon support having a minimum BET surface area of 1000 $m^2/g$; a nitrogen content of at least 2.5 weight percent, which is present in the form of pyridine, pyridone or pyrrole; a phosphorous content of at least 3 weight percent, which is present in the form of phosphate and phosphonate; and a plurality of platinum nanoparticles dispersed on the carbon support having a maximum average particle diameter of 1.5 nm, wherein the method comprises the steps of providing a carbon support material having a minimum BET surface area of 1000 $m^2/g$; a nitrogen content of at least 2.5 weight percent, which is present in the form of pyridine, pyridone or pyrrole; a phosphorous content of at least 3 weight percent, which is present in the form of phosphate and phosphonate; and depositing platinum nanoparticles with a maximum average diameter of 1.5 nm onto the carbon support material using an in situ vapor-phase dissociative process.

BRIEF DESCRIPTION OF THE DRAWINGS

FIG. 4. Properties of samples "AC-1" and "AC-2".

FIG. 7. Sample "AC-1" chemical environments and compositions.

FIG. 8. Sample "AC-2" chemical environments and compositions.

FIG. 31. Compositions of polybenzimidazole/heteropolyacid/phosphoric acid doped membranes.

DETAILED DESCRIPTION OF THE INVENTION

Figure 1:
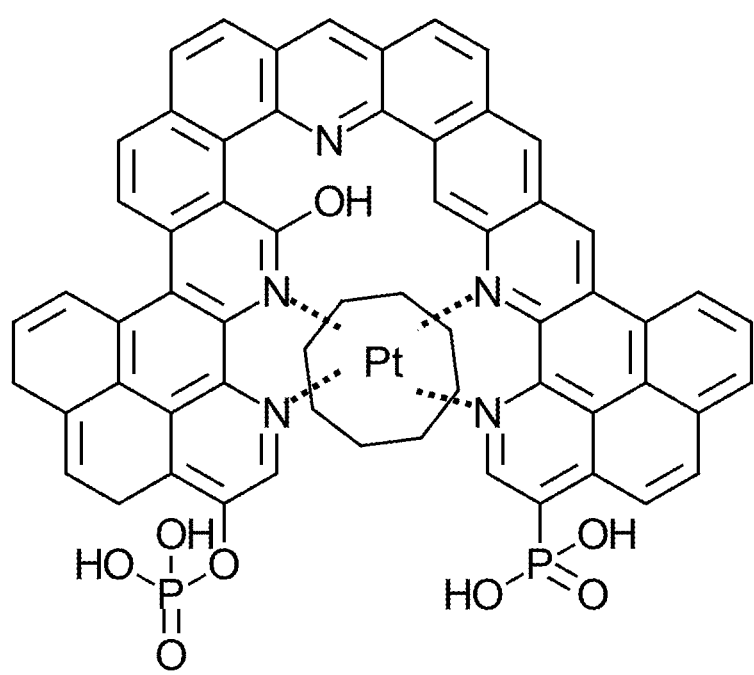
FIG. 1. Representative chemical structure of the platinum-carbon electrocatalyst.

The present invention teaches a new platinum-carbon electrocatalyst material based on a porous carbon with specific properties for use in fuel cells or electrolyzers. In a fuel cell the electrocatalyst may be used at the anode for the hydrogen evolution reaction (HER) or methane or methanol oxidation (for direct methane fuel cells or methanol fuel cells). In an electrolyzer, the electocatalyst may be used at the cathode side for the oxygen reduction reaction (ORR). Conventional activated carbons are not usually considered to be suitable as electrodes for electronic applications because they are made from natural precursors such as wood, coconut shells, and coal that often contain high amounts of impurities (i.e., metals and ash) and therefore have low electrical conductivities. However, teaches an electronic-grade carbon as a platinum support that is made from low-cost high-purity sugars such as sucrose, glucose, fructose, and cornstarch. Because of the high purity of these carbons, they exhibit high electrical conductivities.

The carbon supports of the invention have high surface areas (>1000 m$^2$·g$^{-1}$) with tunable pore size distributions (5-200 nm) that can improve Pt dispersion and enhance transport of gasses or liquid water through the carbon. Furthermore, the carbons contain nitrogen and phosphorous functional groups on their surface, depending on the chemical precursors used during their production. These heteroatoms are mostly in the form of pyridinic nitrogen, phosphate, and phosphonate groups at carbon edge sites that not only protect the more vulnerable graphitic edge sites from oxidation, but also act as ligands that tightly bind Pt nanoparticles. As a result, these carbon supports inhibit surface diffusion and Ostwald Ripening, both of which drastically reduce the activity of conventional carbon-supported Pt electrocatalysts over time. Moreover, these functional groups facilitate rapid transport of protons to the Pt catalyst crystallites, thereby improving the intrinsic activity of the Pt.

Nitrogen-doped carbons have can have high catalytic activity towards the oxygen reduction reaction (ORR), the hydrogen evolution reaction (HER), the oxygen evolution reaction (OER), and the methanol oxidation reaction (MOR). The nitrogen/phosphorus doped carbons of the present invention contains bipyridine-like nitrogen functional groups, plus active proton conducting phosphate/phosphonate functional groups, it may possess catalytic activity toward methane oxidation in a PEMFC at temperatures as low as 80° C. In addition, the pore size distribution can also affect the capillary forces that allow facile diffusion of water in and out of the active catalytic layer, which is beneficial for the direct-methane PEMFCs. The present invention teaches how to make and use carbon support materials with this proper-sized pores.

Two preferred nitrogen/phosphorus doped carbons, containing pyridine, pyrrole, pyridone, phosphate, and phosphonate surface functional groups, are active in direct-methane PEMFCs. The carbon preparation methods are described below and they were also characterized by ICP-AES elemental analysis, BET, and XPS. After depositing Pt nanoparticles onto these carbon supports, the metal loading, particle size, and dispersion uniformity were investigated with TGA, XRD, and TEM, respectively. Lastly, the catalysts were used to prepare MEAs and tested in direct-methane PEMFCs and hydrogen PEMFCs, both at 80° C., as well as at 160° C.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

In this patent application the term "mesoporous" means having pores with diameters from 5 and 100 nm. The term "microporous" means having pores with diameters from 1 to 5 nm. "BET" and "BET surface area" means Brunauer-Emmett-Teller theory (Bunauer et al. 1938) and "DFT" means Density Functional Theory (Lastoskie et al. 1993). An "In-situ vapor-phase dissociative process" means a process wherein carbon and the Pt precursor are dry mixed, and then heated to vaporize the Pt precursor. The process results in reduced Pt nanoparticles which are bound or anchored by ligands on the carbon surface, producing highly dispersed Pt on the carbon support. The ligands are either nitrogen-based or phosphorous-based, preferably nitrogen-based Example 1: preparation of carbon supports. All starting materials were purchased from Aldrich and used as-received. To add nitrogen and phosphorus heteroatoms, ammonium phosphate and phosphoric acid were added to the carbohydrate mixture at specific formulations, henceforth called AC-1 and AC-2. For AC-1, the formulation was 36.7 wt. % cornstarch, 19.4 wt. % ammonium phosphate and 43.9 wt. % phosphoric acid. For AC-2, the formulation was 14.7 wt. % dextrose, 22 wt. % cornstarch, 19.4 wt. % ammonium phosphate and 43.9 wt. % phosphoric acid. These formulations are the composition before carbonization. The carbon supports were prepared by first mixing the ingredients above (for AC-1 or AC-2) neat using an overhead stirrer for five minutes. The slurry was then dried in air at 180° C. for 2 hours. The solids were then crushed, screened through a 4-mesh size sieve, and placed inside a box furnace, carbonized, and then activated under flowing $N_2$ at 550° C. for 4 hours to obtain the critical surface area and microporous/mesoporous structure. The carbons were next washed with water to remove excess phosphoric acid and dried in air at 110° C. for 24 hours. Finally, the carbon was ball-milled into a powder and sieved through a 400-mesh screen to give particles in the 5-50 micron size range.

Example 2: platinum deposition onto the carbon support. Pt nanoparticles were deposited onto the activated carbons by an in situ vapor-phase dissociative process. Platinum (II) acetylacetonate ($Pt(acac)_2$, 97%) was purchased from Aldrich and used as-received. First, the $Pt(acac)_2$ precursor (0.045 g, for a loading of 2.0 wt. % of Pt in the final catalyst) was hand-mixed with either the AC-1 or AC-2 carbon support (1.0 g) for at least 15 min. The dry mixture was then heat treated at 250° C. for 4 hours under air. The catalyst powder was then ground, screened, and stored in a glass vial for later analysis and use.

Example 3: methods for characterizing carbon supports. Elemental analysis of the activated carbons was carried out using ICP-AES techniques. Surface area and pore size distribution were analyzed by a Micromeritics Gemini. $N_2$ adsorption isotherms over the carbon samples were measured at 77K. BET surface area, t-plot micropore volume and pore widths were calculated by applying the BET equation to the adsorption isotherms. X-ray Photoelectron Spectroscopy (XPS) was used. Samples were measured at a 90° Take-Off-Angle (TOA) yielding a sampling depth of about 10 nm. The analysis area was approximately 500 μm in diameter. Analyses were performed with an Al kα x-ray source. Charge neutralization of the sample surface was achieved with the use of a low-energy electron flood gun. Energy scales of the spectra are referenced to the C 1s C—C/C—H signal at 284.5 eV. High-energy resolution XPS analyses of the C 1s, N 1s, O 1s, and P 2p regions were also performed on the sample. XPS hi-resolution analysis provides information on the bonding state (chemical environment) of the element in question.

Example 4: methods for characterizing the platinum-carbon catalysts. Thermogravimetric analysis (TGA) was performed in the temperature range of 25-1080° C. with a scanning rate of 20° C.·min$^{-1}$ using a thermogravimetric analyzer (TA, TGA-Q5000) under an air flow rate of 25 mL·min$^{-1}$. XRD patterns of the catalysts were collected using a Scintag XDS2000 θ/2θ diffractometer with a Cu target X-ray tube ($\lambda_{K\alpha}$=1.540562 Å) operating at 45 kV and 40 mA. The catalyst samples were ground into powder with a mortar and pestle and packed into a rectangular plastic holder that was 2 mm deep. XRD patterns were collected over the 2θ range from 30° to 90° with a step size of 0.05° and a count time of 5 s. The location, amplitude, area and full-width at half-maximum (FWHM) was determined by fitting each peak with a Pearson function using PeakFit software (Jandel Scientific Software). TEM images were taken using an FEI Talos F200X microscope. The catalyst samples were prepared for TEM by dispersing a small amount of catalyst in ethanol and dropping an aliquot onto a carbon-coated copper grid.

Example 5: Membrane electrolyte (MEA) fabrication for fuel cells that will be tested at 80° C.: The anode ink was first prepared by combining Pt/AC-1 or Pt/AC-2 catalyst, water, isopropanol, and [DEMA][TfO] ionic solution (n,n-diethylmethylarnine, trifluoromethanesulfonic acid). Ionic solution was added such that the ionic solution was 66.7 wt. % of the total mass of the carbon and ionic solution in the ink. Water was added in an amount that was ten times the mass of the carbon in the ink. Isopropanol was then added to the ink in a ratio of water/isopropanol equals 3:2. The ink was sonicated in an ultrasonic bath for 5 minutes, followed by mixing in a vortex mixer for 2 minutes. The sonicating and mixing process was repeated three times. The ink was painted onto E-tek hydrophobic GDLs to make the gas diffusion anode and the anode was placed under an IR 250W heat lamp to evaporate the water/isopropanol solvent out of the catalyst layer. A commercial gas diffusion electrode (Pt/C with a Pt loading of 0.5 mg·cm$^{-2}$) was used as the cathode. Both the anode and the cathode were prepared with areas of 5.48 cm$^2$. The electrodes were hot pressed onto a pre-cleaned Nafion®-1110 membrane using a digital combo multi-purpose press (DC14, GEO Knight & Co., Inc.), at 80° C. and 60 psig for 90 s.

Example 6. Testing methods for a fuel cell operated at 80° C.: Hardware consisting of a single cell with an area of 5.48 cm$^2$ and single serpentine flow fields (Fuel Cell Technologies, Inc.) was used for this study. Humidified methane and oxygen were fed to the anode and cathode, respectively, at the same flow rate (0.3 L·min$^{-1}$). Methane and oxygen were humidified at 60° C. and 80° C., respectively, by sparging them through bubblers using modular gas handling and gas metering systems (Lynntech, Inc.), while the cell was maintained at 80° C. For this study, the effluent streams from each side of the fuel cell were always kept at 30 psig during testing by backpressure regulators and liquid water was condensed out in traps. A Gamry Instrument potentiostat was used to perform polarization studies by first remaining at open circuit for 60 minutes and then stepping down from the open circuit potential until the limiting current was reached.

Figure 30:
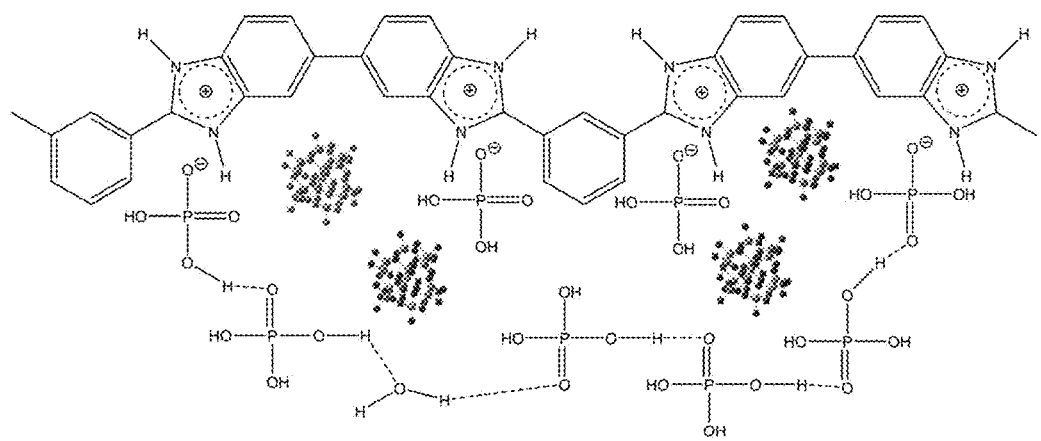
FIG. 30. Structure of composite PBI/HPA/PA membrane.

Example 7. Preparation of polybenzimidazole (PBI) composite membranes: PBI was synthesized and prepared by reacting 3,3'-diaminobenzidine tetrahydrochloride and isophthalic acid with a molar ratio of 1:1 using polyphosphoric acid as a solvent. The synthesis obtained a high molecular weight PBI, approximately 54 kDa, with an inherent viscosity of 0.98 dLg$^{-1}$. The polymer was soluble in dimethylacetamide (DMAc). A solution of 10 wt % of PBI was prepared by sonicating the PBI solid in DMAc that contains 3 wt LiCl at 60° C. for 4 h, followed by stirring and heating at 80° C. for 3 days to produce a homogeneous PBI/DMAc solution. In a separate container, a solution of 5 wt % of silicotungstic acid, a heteropoly acid (HPA), was dissolved in DMAc by gently stirring at room temperature. The two solutions were then mixed in the right proportions and stirred at room temperature for at least 8 h to obtain 5%, 10%, 15%, 20%), 30%), and 40% HPA in PBI. All casting solutions, including a 0% HPA as the control, were diluted to the final 5 wt % concentration of PBI in DMAc. The solution was then poured onto a glass plate and cast using a DCX Plus DC Motor Control doctor blade, setting at 20 mil, at initially 20%, and then 80%, of its maximum speed to produce a uniform thin film of 20-50 microns. The cast film was then covered with a wire mesh on top and dried in an oven at 120° C. for 24 h. To remove the film after drying, the glass plate was briefly steamed for 5 seconds above a boiling water bath and carefully peeled off the membrane using a sharp razor blade. The membrane was immediately placed in an oven at 120° C. for at least 2 hours before doping with 85 wt % concentrated phosphoric acid (PA). The doping procedure was kept the same for all membranes. First, the dried membrane was immersed in warm phosphoric acid solution at 40° C. for 1 hour. Then, the acid solution was allowed to cool to ambient temperature, and the membrane was slowly soaked in phosphoric acid for 7 days to form a dense composite membrane ready to make MEA for fuel cell testing. FIG. 30 shows the chemical structure of the PBI/HPA/PA membrane.

The in-plane ionic conductivity of these membranes was measured using a BekkTech (BT-112) insert with 4 platinum electrodes located inside a custom stainless steel ring and assembled into fuel cell hardware. The measurement was carried out using a Gamry Electrical Impedance Spectrometer (EIS 300). Frequency was swept between 10 MHz to 1 Hz for the EIS experiment as a function of temperature and humidity. The humidity of each sample was controlled by using a Scribner Fuel Cell Test System (Scribner 850e). Humidified nitrogen was fed at 0.1 L/min to one inlet and exited at another outlet. All others inlet/outlet of the hardware were plugged. Nitrogen was flowed and humidified through sparging bottle with modular gas handling and gas metering system (Scribner, Inc.). The temperature of the cell and the sparging bottle were adjusted to reach desire conditions. The collected impedance spectra were fitted to the Randall circuit to find the total resistance of the membrane.

In order to calculate the doping level of PA in the membranes, three samples of 4×4 cm$^2$ of un-doped membranes were pre-weighted, followed by impregnation in 85% phosphoric acid solution for 7 days. The doped membranes were completely wiped off any excess PA on the surface and dried at 110° C. under vacuum until no more weight changed observed. The weight difference between the doped and un-doped membranes were obtained and used to determine the doping level.

In another test, phosphoric acid (PA) doping level is defined as the mole number of H3PO4 per repeat unit of PBI. In order to calculate the doping level of PA in the membranes, three samples of 1×1 cm2 of undoped membranes were pre-weighted, followed by impregnated in 85% phosphoric acid solution for 7 days. The doped membranes were then hot-pressed at 5 tons and 150° C. to remove any excess phosphoric acid solution as well as absorbed water. The weight difference between the doped and undoped membranes were obtained and used to determine the doping level. FIG. 31 compares the compositions of polybenzimidazole-based phosphoric acid-doped (PBI/PA) versus polybenzimidazole-based heteropolyacid-added phosphoric acid-doped (PBI/20% HPA/PA) membranes.

Figure 32:
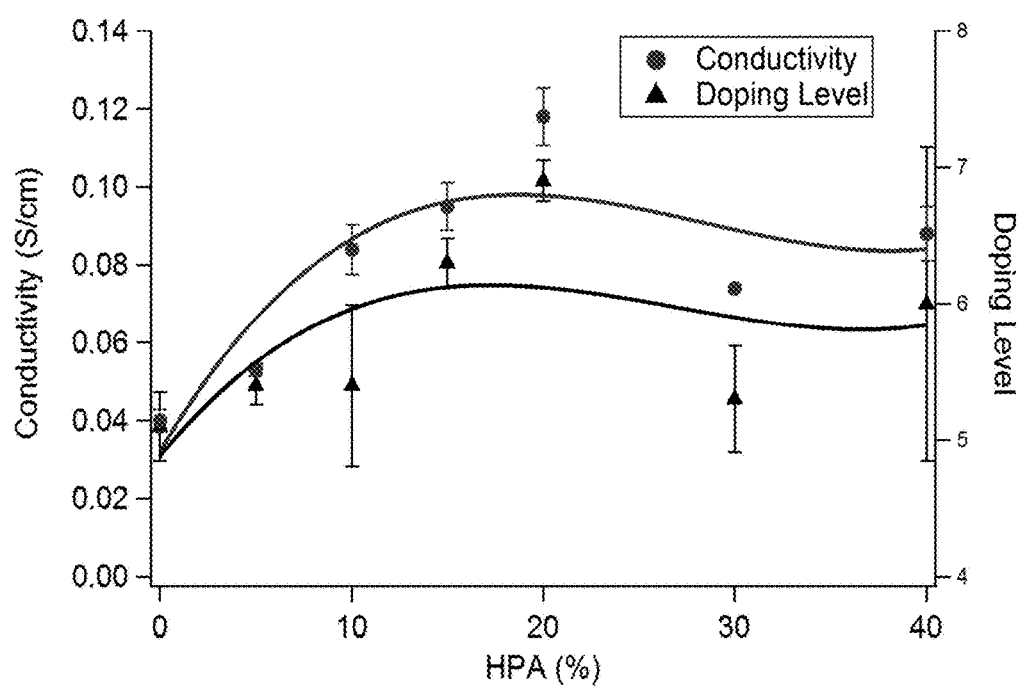
FIG. 32. Conductivity of PBI membranes with different loading levels of heteropolyacid tested at 160° C. and 5% relative humidity.

FIG. 32 shows the effects HPA loading level, and doping level (PA doping) on protonic conductivities of the corresponding membranes. At 160° C. and 5% RH condition, addition of up to 20% HPA increased the acid doping level from 5 to 7, but dropped to 6 at higher than 20% HPA addition. The conductivity results are consistent with the doping data showing conductivity plateau at 20% HPA.

Example 8: Membrane electrolyte (MEA) fabrication for fuel cells that will be tested at 160° C.: The anode ink was prepared by combining the catalyst, water, and isopropanol solution. Water was added in an amount that was ten times the mass of the carbon in the ink. Isopropanol was added to the ink to obtain a water/isopropanol ratio of 3:2 by weight. The ink was sonicated in an ultrasonic bath for 30 minutes, followed by mixing with a vortex mixer for 5 minutes. The ink was then sprayed onto a hydrophobic gas diffusion layer (GDL) produced by Danish Power Systems Inc. (DPS) to make the anode. The wet anode was then placed under an IR 250 W heat lamp to evaporate the water/isopropanol solvent in the catalyst layer. A DPS Pt/C GDE (with a Pt loading of 1.5 mg·cm$^{-2}$) was used as the cathode for all tests. Both the anode and cathode were prepared with an area of 5.48 cm$^2$, except for the samples used for the larger surface area run (using GC analysis) that had an area of 25 cm². The electrodes were hot pressed onto the opposite sides of a membrane made from PBI containing 20 wt % silicotungstic acid, a heteropoly acid (HPA), and then doped with PA as described above. This membrane material is abbreviated a "PBI/20%HPA/PA". The membrane electrode assembly was pressed at 1.5 tons at 100° C. for 3 minutes before hardware assembly and testing.

Example 9. Testing methods for a fuel cell operated at 160° C.: A single cell with an area of 25 cm² and single serpentine flow fields (Fuel Cell Technologies, Inc.) was used for this study. To break in the MEA, the fuel cell was operated by feeding humidified hydrogen and oxygen to the anode and cathode at flow rates of 0.3 L·min⁻¹ and 0.2 L·min⁻¹, respectively. Both gases were fed and humidified by sparging them through a bottle filled with DI water using a modular gas handling and gas metering system (Scribner, Inc.). Both hydrogen and oxygen were humidified at 80° C. while the cell was maintained at 160° C. The fuel cell was conditioned at a current density of 0.2 A·cm⁻² for at least 24 hours. After the break-in process, the anode feed was switched to methane at the flowrate of 0.3 L·min⁻¹ and the electrode was purged for at least 1 hour to clear out the hydrogen before measuring fuel cell polarization curves. The effluent from the fuel cell flowed through a backpressure regulator, and liquid water was condensed out by passing the gas through a bottle held at room temperature. For this study, the backpressure was kept at 30 psig during fuel cell testing. A potentiostat (Gamry Instruments) was used to collect polarization curves by first remaining at open circuit for 10 minutes, then stepping down from the open circuit potential (OCV) until the limiting current was reached. For anode polarization, nitrogen instead of oxygen was fed to the cathode, which became a pseudo-reference electrode. The potential was then scanned from open circuit to more positive potentials until a limiting current was achieved.

Analysis and results of test based on Examples 6 & 9: To analyze the methane oxidation product, a chronoamperometry sequence was applied on the fuel cell to continuously draw more than 15 mA of current from the anode to the cathode. After 15 minutes, the methane feed was reduced to 0.03 L·min⁻¹. After another 15 minutes, the anodic gas exhaust was sampled and analyzed with two on-line gas chromatographs (Agilient GC 7890B) with dual flame-ionization/thermal-conductivity detectors (FID/TCD). Hydrogen was flowed at 30 mL·min⁻¹ and used as the carrier gas. The GC oven was initially set at 35° C. for 5 min then heated to 225° C. at a ramp rate of 20° C.·min⁻¹. Several standard CO and CO₂ gas mixtures at 0.2 vol. %, 0.4 vol. %, 0.6 vol. %, 0.8 vol. %, and 1.0 vol. % concentrations were prepared and used to generate GC calibration curves. The theoretical concentrations of the CO and CO₂ products expected in the outlet gas from the anode were calculated using Faraday's law based on six and eight electron reactions, respectively.

Results and discussion of tests based on assembled fuel cells of examples 6 & 9: The MEAs were made using electrocatalysts "AC-1" and "AC-2". AC-1 was formulated by reacting cornstarch, which is polymerized glucose, with phosphoric acid in the presence of ammonium phosphate. The first step in the hydrolysis of cornstarch is the cleavage of an ether linkage to produce glucose. For AC-2, however, dextrose (naturally occurring glucose) was also added to the formulation.

Although not wishing to be bound by theory, the next step is the acid hydrolysis of glucose, which generates mainly 5-hydroxymethylfurfural, levulinic acid, and formic acid Then with continued heating, the 5-hydroxymethylfurfural and levulinic acid polymerizes (with the further loss of water) to leave behind char, which is mostly carbon with a small amount of residual hydrogen and oxygen. When the char is subsequently carbonized (i.e., at >500° C. in an inert atmosphere) the polymer decomposes, evolving mainly $CO_2$, CO, and water to form high purity activated carbon. It is further our theory the during these processing steps, cross-linked phosphate esters form as the phosphoric acid reacts with glucose, and pyrophosphoric acid forms as phosphoric acid is dehydrated. Upon further dehydration, polymers of metaphosphoric acid form. As the carbon is heated above 500° C., direct P—C bonds are formed producing phosphonate functional groups on the surface of the carbon support.

Not wishing to be bound by theory, simultaneously, ammonium phosphate decomposes upon the rapid application of heat according to the reaction in scheme 1, where $(HPO_3)_n$ represents polymeric metaphosphoric acid.

Scheme 1

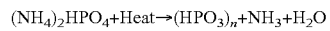

$(NH_4)_2HPO_4 + Heat \rightarrow (HPO_3)_n + NH_3 + H_2O$

The gases that are released, included ammonia, water vapor, and volatile organic compounds from the pyrolysis of carbohydrates, generate porosity in the carbon support. Gases escaping from the charring mass create the channels that later allow the ingress of reactants and water into the carbon inside the MEA. Not wishing to be bound by theory, the decomposition of ammonium phosphate allows nitrogen to be incorporated into the carbon as pyridinic, pyridonic, and pyrrolic species at carbon edge sites, and into the graphitic lattice as quaternary nitrogen.

Whereas typical carbons derived from the acid hydrolysis of sugars have low surface area. However, with the phosphoric acid and ammonium phosphate additions of the present invention, it is possible to form high surface area carbon (>1000 m²·g⁻¹) with a tunable pore size distribution from carbohydrates. The carbon supports of the present invention use a combination of an acid and a pore former to tailor its pore size. Not wishing to be bound by theory, the acid catalyzes the decomposition of sugar at temperatures below its melting point, and the polymer conforms around the pore formers to lock in the structure. Without the acid, the sugars would completely melt, and the pores would collapse. The pore formers are cationic nonmetal salts (for example ammonium compounds). The ammonium salts occupy space while the sugars polymerize, and then during the pyrolysis steps, they decompose to generate the pores. The steric bulk of the pore former and the amount used in the formulation allow the pore size distribution and surface area of the resultant carbon to be precisely and critically tuned. In contrast, carbons prepared without a pore former have much lower surface areas (<10 m²·g⁻¹) and smaller pore diameters (<2 nm). The presence of the ammonium compound is critical to generating mesopores.

Elemental analysis reveals a higher nitrogen content in AC-1 than in AC-2, but similar oxygen content in both carbons, which indicates a similar amount of phosphates and phosphonates had formed on their surfaces. The presence of both N and P on these activated carbon materials is critical later for depositing nanoparticles of Pt, making those nanoparticles stable and resistive to de-bonding, migration or agglomeration, and also for promoting the critical diffusion properties needed for using it as an electrocatalyst in either a fuel cell or electrolyzer. While nitrogen (N) atoms form strong covalent bonds with Pt atoms due to its high electronegativity, phosphorous (P)-containing functional groups form ionic bonds with Pt atoms; increasing the dispersion of Pt on carbon materials during deposition. In addition, dual-doped carbons (using both N and P) have both enhanced catalytic activity and long-term stability. Protons on the phosphate groups also aid in transferring protons from the Pt nanoparticles, and help to overcome the problem of slow proton transport. For example there is slower proton transport from platinum to a Nafion® ionomer. Furthermore, high concentrations of N and P functional groups increase the oxidation resistance of the carbon-supported Pt catalyst.

Figure 3:
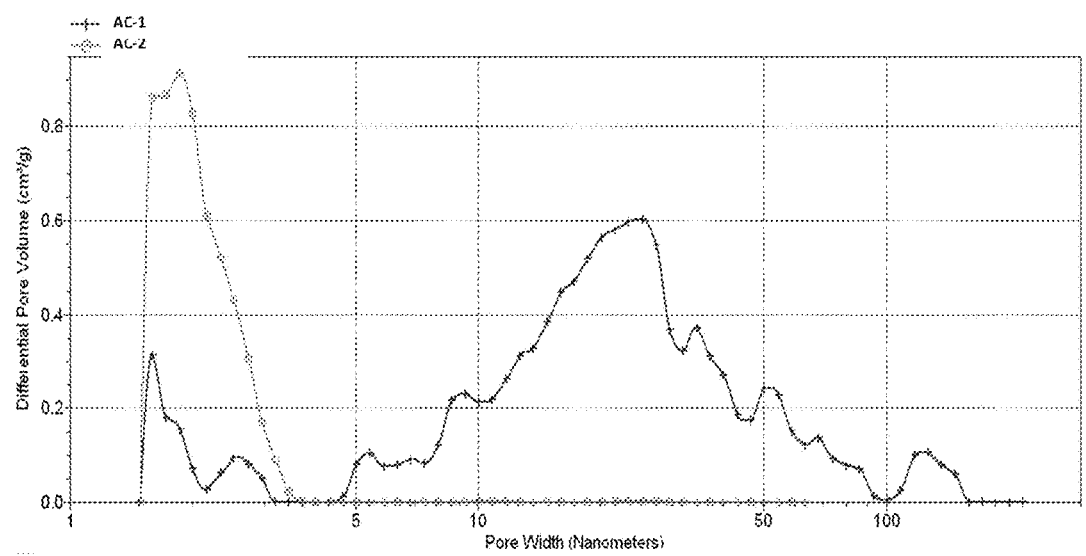
FIG. 3. Differential pore volume vs. pore width for samples "AC-1" and "AC-2".
Figure 5:
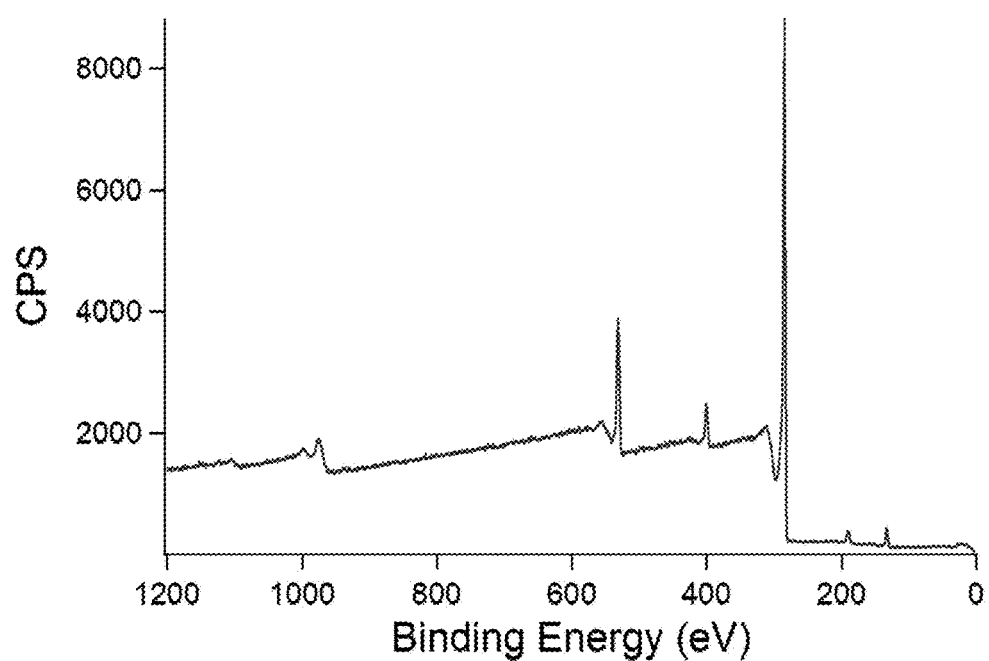
FIG. 5. X-ray photoelectron spectroscopy (XPS) for sample "AC-1".
Figure 6:
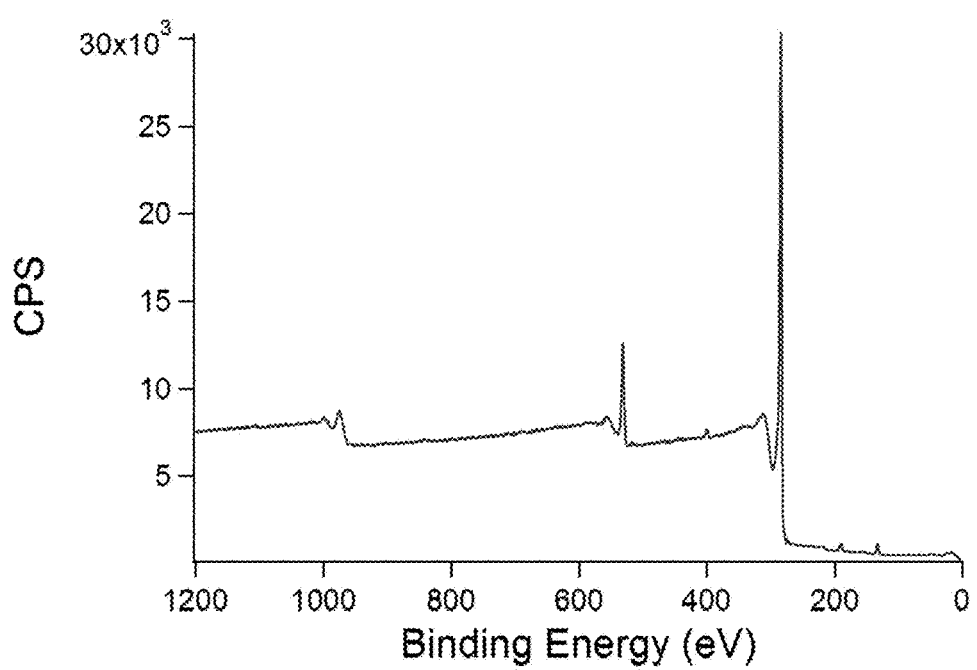
FIG. 6. X-ray photoelectron spectroscopy (XPS) for sample "AC-2".

FIG. 3 shows the pore size distributions in AC-1 and AC-2 as measured by the Density Functional Theory method. The pore distribution showed one smaller peak in the microporous range (1 to 5 nm) and another larger peak in the mesoporous range (5 to 100 nm) for AC-1. The AC-2 sample, however, only showed a single peak in the microporous range (1 to 5 nm). As a result, AC-2 contained only microporous structure, and it had a higher BET surface area. FIG. 4 summarizes the BET surface areas, pore volumes, and elemental compositions of these two representative carbons. Not wishing to be bound by theory, AC-1 had lower surface area, but its mesoporous structure can help gasses diffuse more rapidly to the catalytic sites. On the other hand, AC-2 has better Pt dispersion due to its higher surface area and enhanced water diffusion due to greater capillary forces within its smaller pores.

The chemical form of the heteroelements (N and P) is critical for the exceptional performance of the carbon supports of the present invention. Chemical information on the bonding state of these doping elements is determined by high-resolution X-ray photoelectron spectroscopy (XPS). FIGS. 5-8 summarize the peak analysis that provides information on the chemical environments (derived from the binding energies) and compositions (based on the peak areas) for AC-1 and AC-2. Both carbon materials had peaks at similar positions with different intensities, which indicated that nearly identical surface structure formed in these carbons due to their similar preparation methods.

Figure 9:
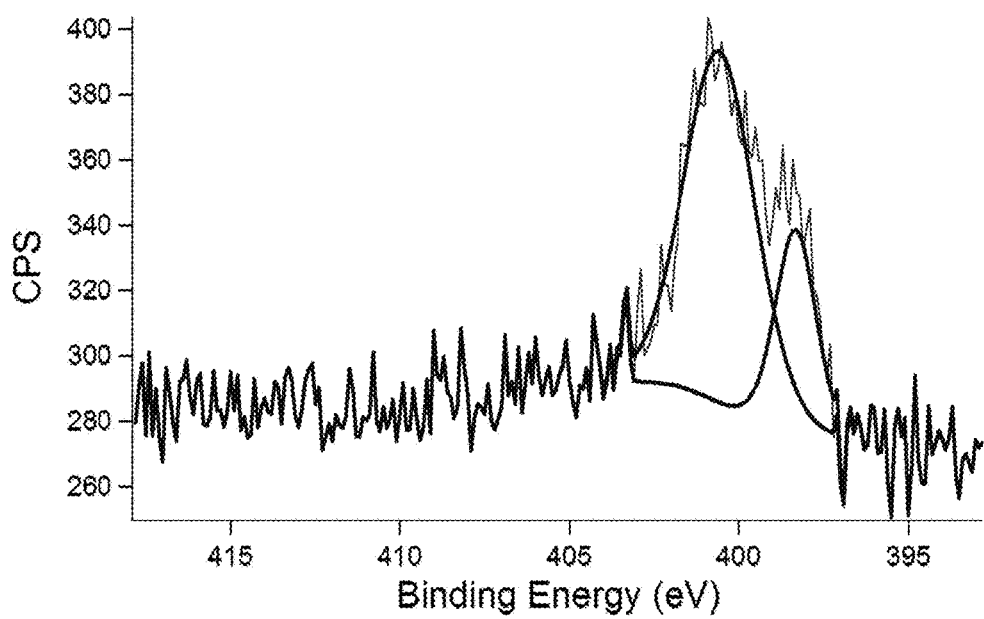
FIG. 9. Sample "AC-1" N 1s Region from XPS.
Figure 10:
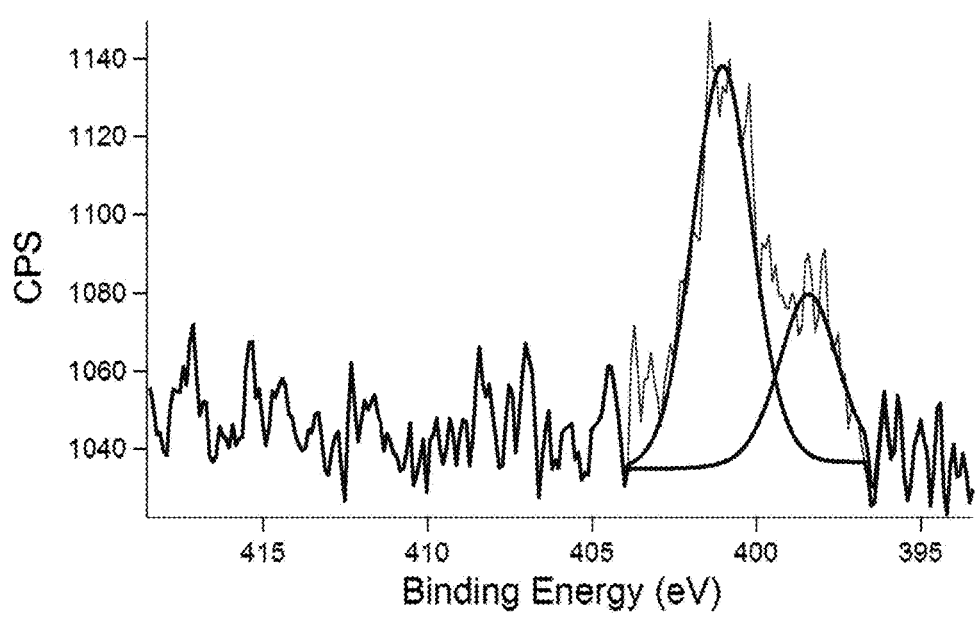
FIG. 10. Sample "AC-2" N 1s Region from XPS.

Both carbons exhibited similar features in the N 1s region, as shown in FIGS. 9 and 10. The binding energies for N 1s electrons in pyrrole and pyridone all occur near a binding energy 400.1 eV. Splitting of this peak indicated that at least two distinct chemical species of N were present. The strong deconvoluted peak at 398.5 eV was assigned to pyridinic nitrogen, which is located at carbon edge sites. A second deconvoluted peak at 400.5 eV occurred at the binding energy of both pyrrolic and pyridonic nitrogen.

Figure 11:
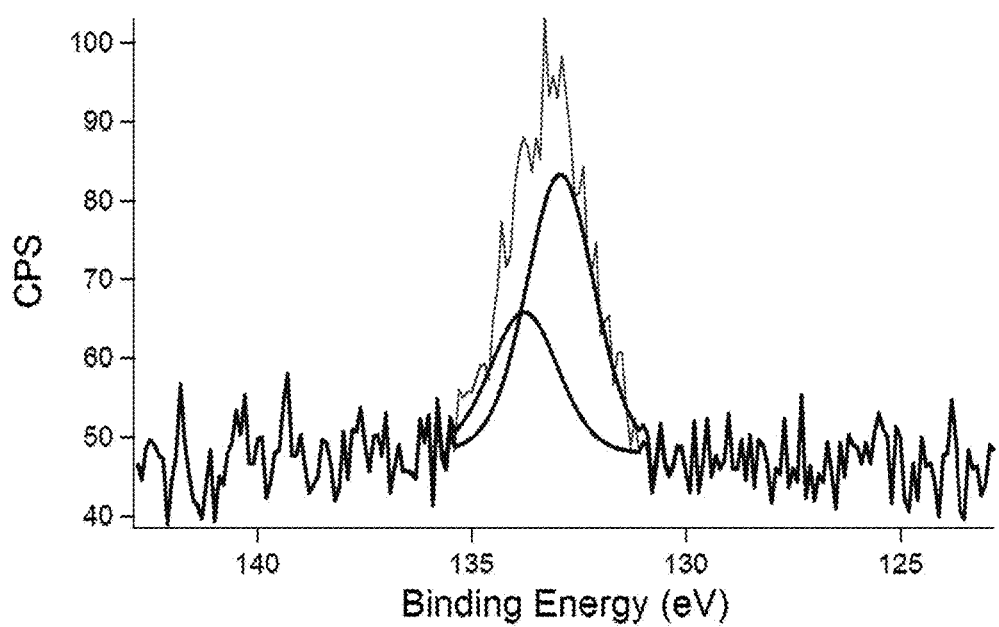
FIG. 11. Sample "AC-1" P 2p Region from XPS.
Figure 12:
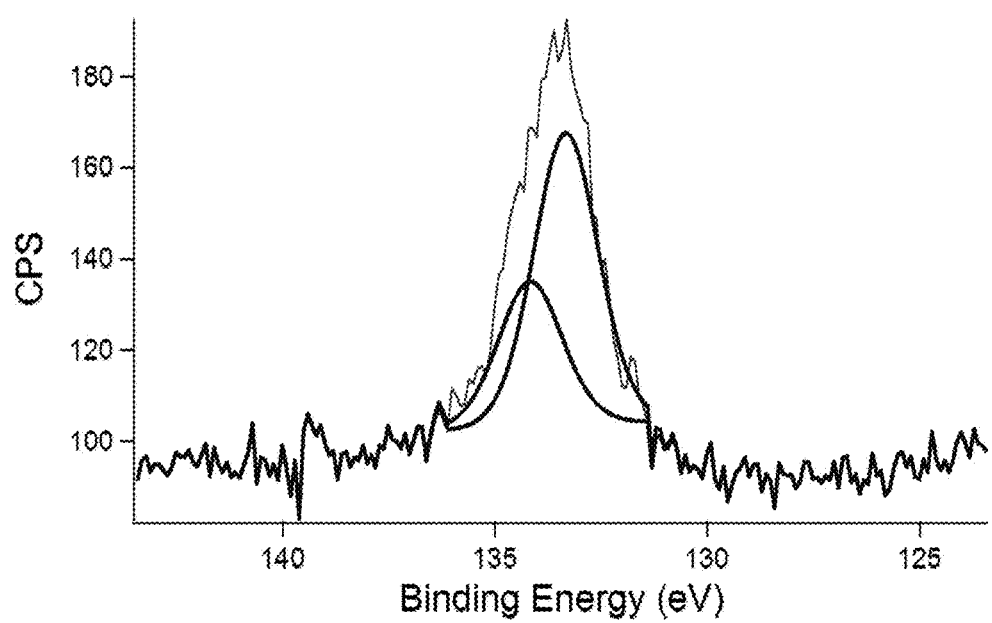
FIG. 12. Sample "AC-2" P 2p Region from XPS.

FIGS. 11 and 12 show high-resolution XPS signals from the P $2p_{3/2}$ and P $2p_{1/2}$ orbitals for AC-1 and AC-2 whose binding energy was consistent with phosphorus bound to an electronegative element, most likely oxygen. The binding energies are assigned to pyrophosphate and polymerized metaphosphates, whereupon heating phosphoric-acid treated biomass to 500-600° C. approximately 1 eV shifts in the binding energy from 133.7-133.9 eV to 132.7-132.9 eV are observed. This shifted peak is assigned to phosphonates containing C—P bonds.

Figure 2:
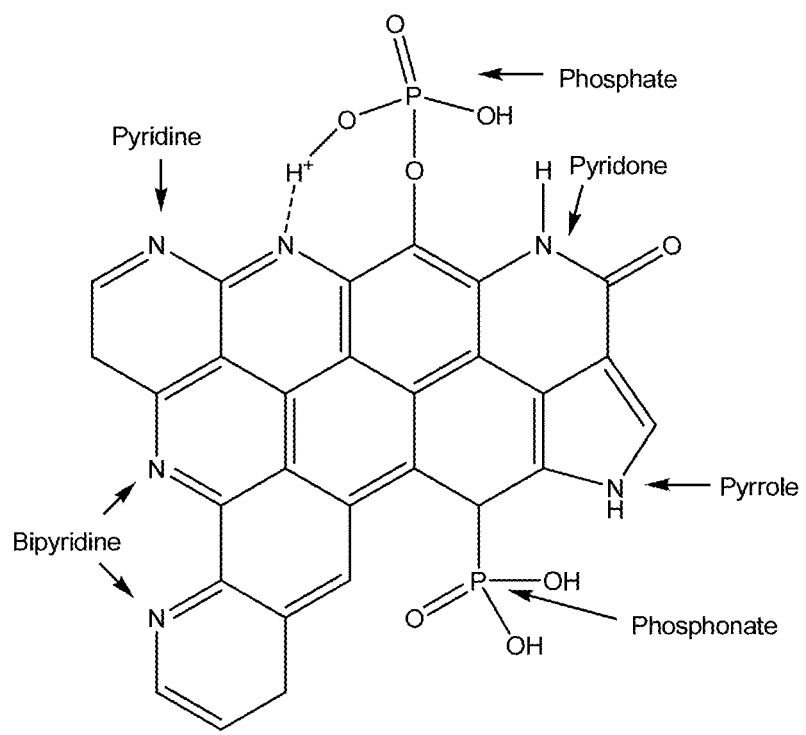
FIG. 2. Typical structure of the carbon support with nitrogen and phosphorous groups.

The modified carbon supports have nitrogen and phosphorous containing surface groups. FIG. 2 illustrates the general structure of these functionalized carbons. The results of this XPS analysis indicated that nitrogen was bonded to the carbon structure as a cyclic amine and not as an oxidized species, and was predominately in configurations similar to pyridine, pyrrole, and pyridone. Phosphorus was likely present as phosphate and phosphonates. These surface functional groups act as ligands that tightly bind Pt nanoparticles (see FIG. 1), thus inhibiting surface diffusion and Ostwald Ripening, which can drastically reduce the activity of Pt electrocatalysts supported on conventional carbon over time. Moreover, these functional groups can facilitate rapid proton transport to the Pt crystallites, improving the intrinsic catalytic activity of the Pt.

Figure 13:
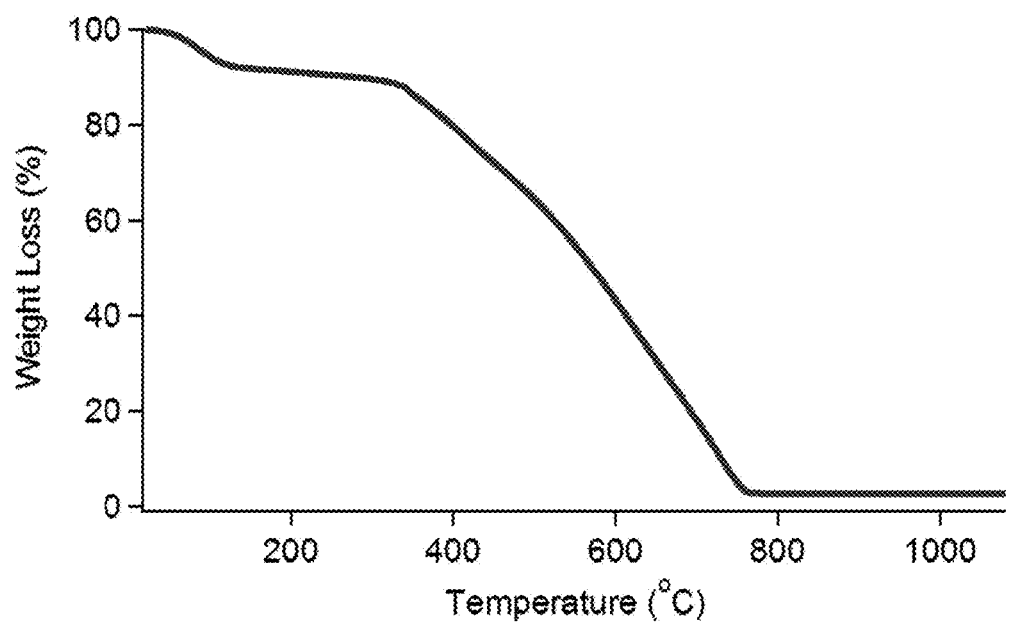
FIG. 13. TGA data for sample "AC-1".
Figure 14:
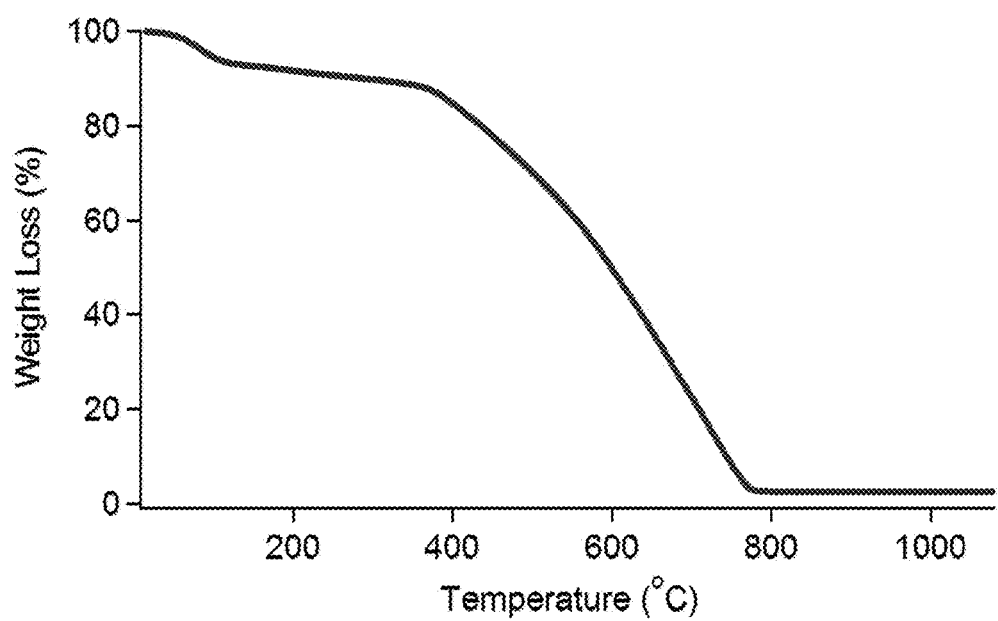
FIG. 14. TGA data for sample "AC-2".

Pt nanoparticles were deposited onto the activated carbons by an in situ vapor-phase dissociative process at 250° C. for 4 hours in air. The Pt loading on the Pt/AC-1 and Pt/AC-2 samples was determined by TGA (FIGS. 13 and 14). Both carbons showed a small weight loss below 100° C. due to the evaporation of water because they are hydrophilic. Most of the weight loss, however, started at 350° C. where the carbons began to decompose. By 800° C., all of the carbon had burned off, leaving behind only pure Pt metal, which comprised 2.7 wt. % and 2.5 wt. % of the original in AC-1 and AC-2 catalyst samples, respectively.

Figure 15:
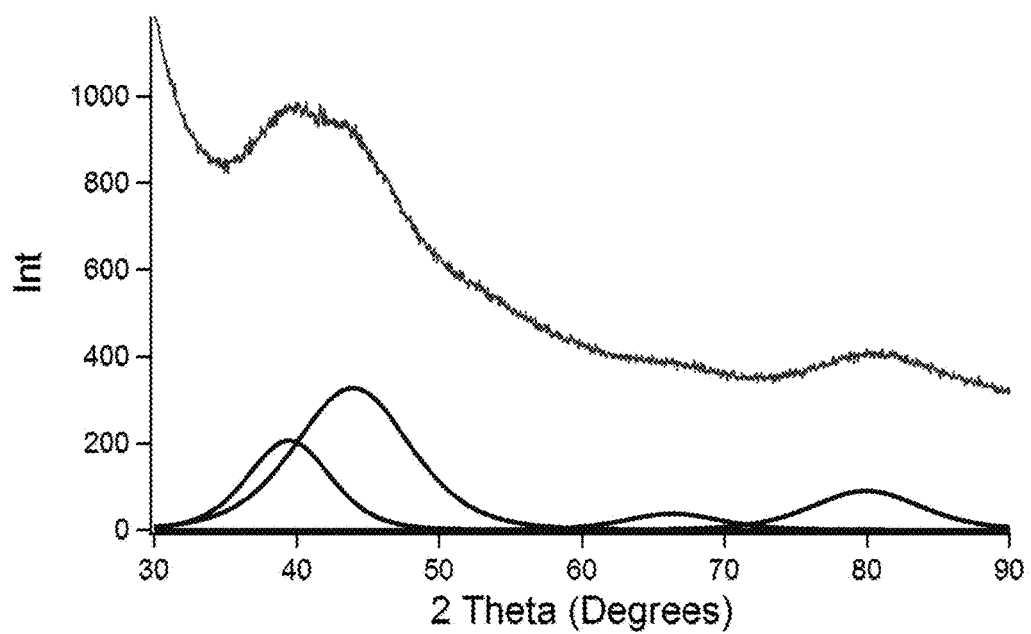
FIG. 15. XRD pattern for sample "AC-1".
Figure 16:
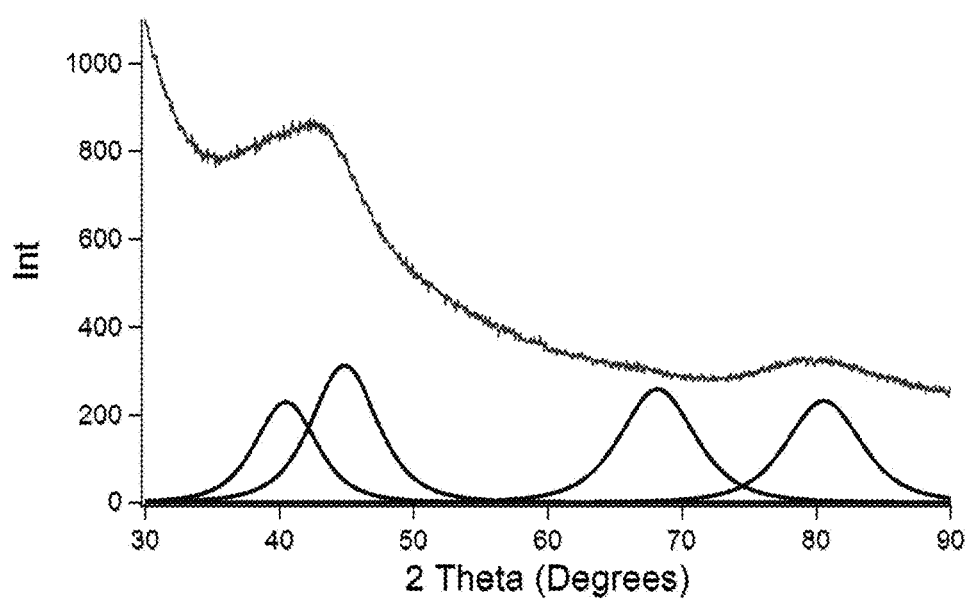
FIG. 16. XRD pattern for sample "AC-2".
Figure 17:
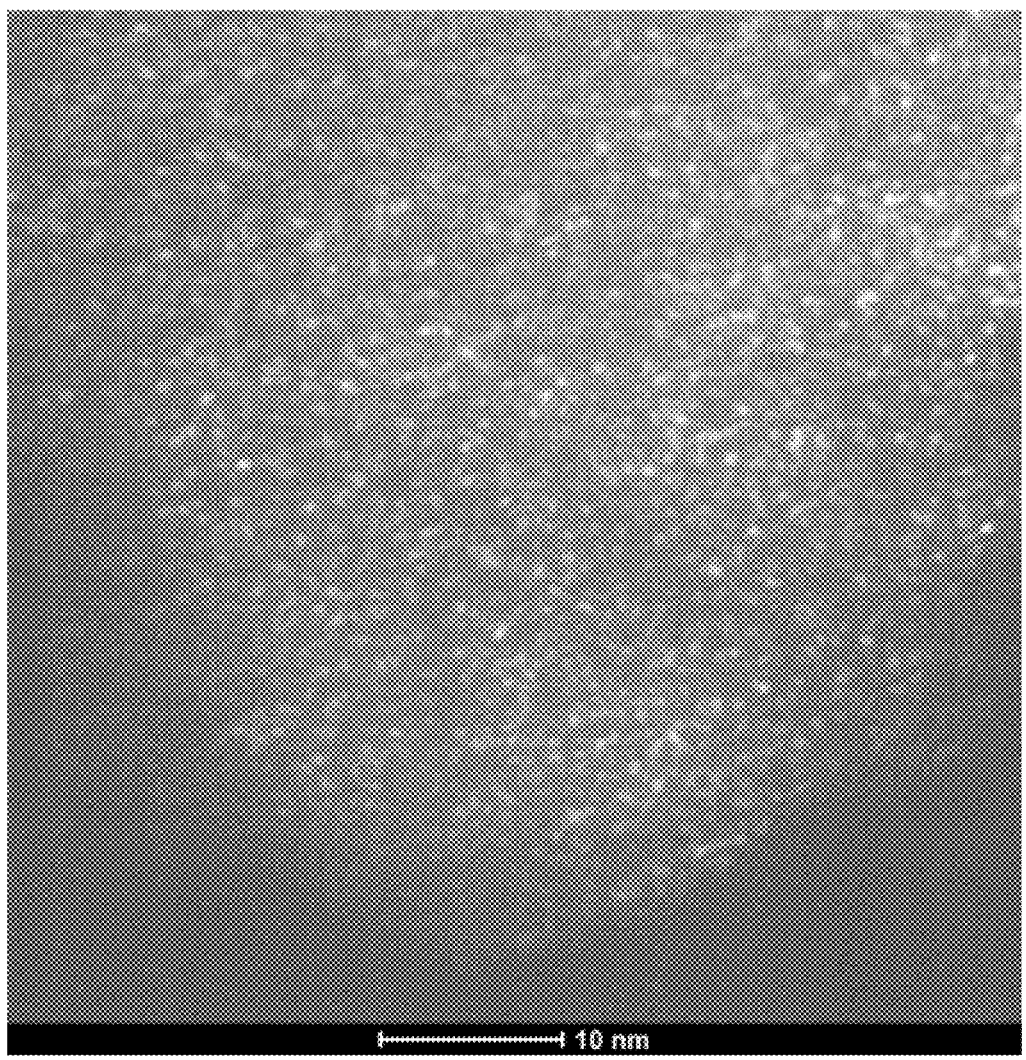
FIG. 17. TEM image for sample "AC-1".
Figure 18:
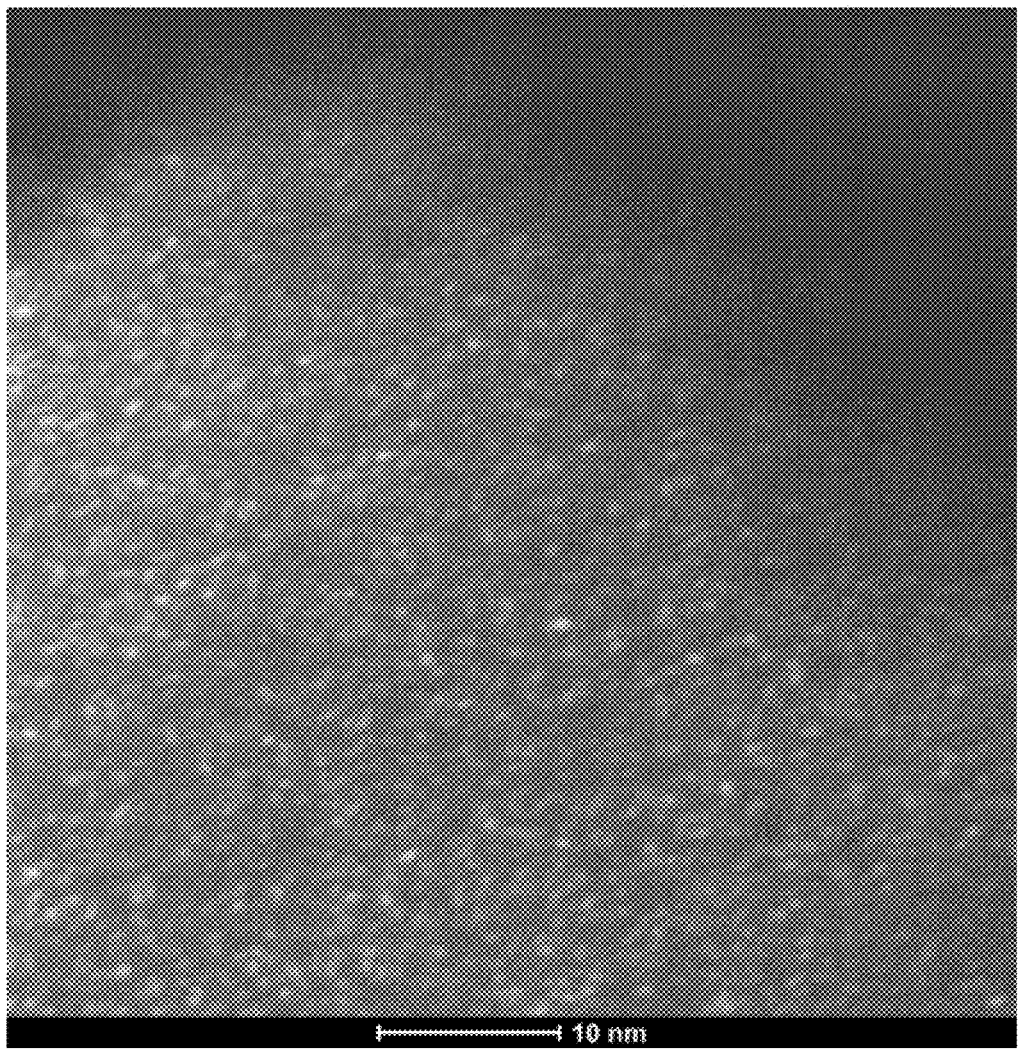
FIG. 18. TEM image for sample "AC-2".

FIGS. 15, 16, 17 and 18 show the XRD patterns and TEM images for the Pt/AC catalysts. FIG. 15 shows the XRD pattern for AC-1, FIG. 16 shows the XRD pattern for AC-2, FIG. 17 shows the TEM image for AC-1 and FIG. 18 shows the TEM image for AC-2. The location, amplitude, area, and full-width at half-maximum (FWHM) were determined by fitting each Pt diffraction peak with a Pearson function using PeakFit software. The diffraction patterns represented all of the reflections corresponding to the face centered cubic (fcc) lattice of the deposited Pt nanoparticles, and the carbon support. The Bragg peaks at 2-Theta angles of approximately 40°, 45°, 68°, and 81° were attributed to the Pt[111], Pt[200], Pt[220], and Pt[311] diffraction planes, respectively. The average size of the Pt crystallites was estimated from the peak broadening using the Scherrer Equation. It was found that AC-1 had a Pt particle size of 0.9 nm and AC-2 had a particle size of 1.5 nm. These results are consistent with the TEM images that show average Pt nanoparticle sizes of 0.68 nm and 1.4 nm in the Pt/AC-1 and Pt/AC-2 catalysts, respectively. This is about half the size of the Pt nanoparticles typically seen in prior art Pt/AC fuel cell catalysts (2-3 nm). The ability to deposit smaller Pt particles onto the surface is a critical feature of the electrocatalysts of the present invention. By making smaller, more stable Pt particles, the catalytic activity is increased, and the total amount of precious metal required can be reduced.

Figure 19:
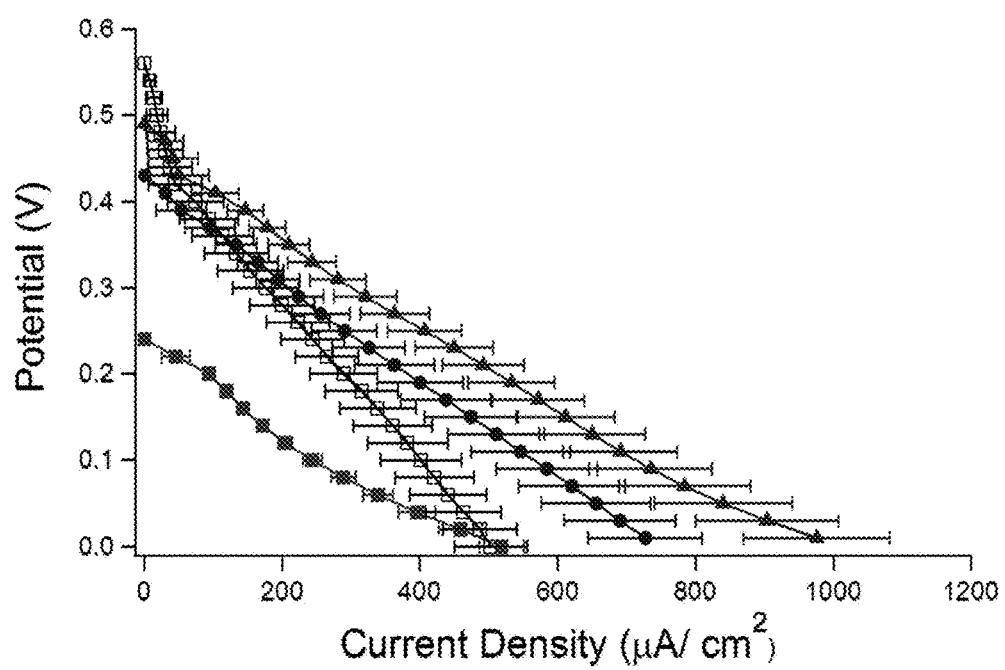
FIG. 19. I-V polarization curves for fuel cells with MEA anodes made of commercial catalyst (2.5 mg-Pt·cm$^{-2}$ loading) (■); OMC-4BP-PtCl$_2$ (0.1 mg-Pt·cm$^{-2}$ loading) (□); Pt/AC-1 (0.1 mg-Pt·cm$^{-2}$ loading) (•; and Pt/AC-2 (0.1 mg-Pt·cm$^{-2}$ loading) (▲).
Figure 20:
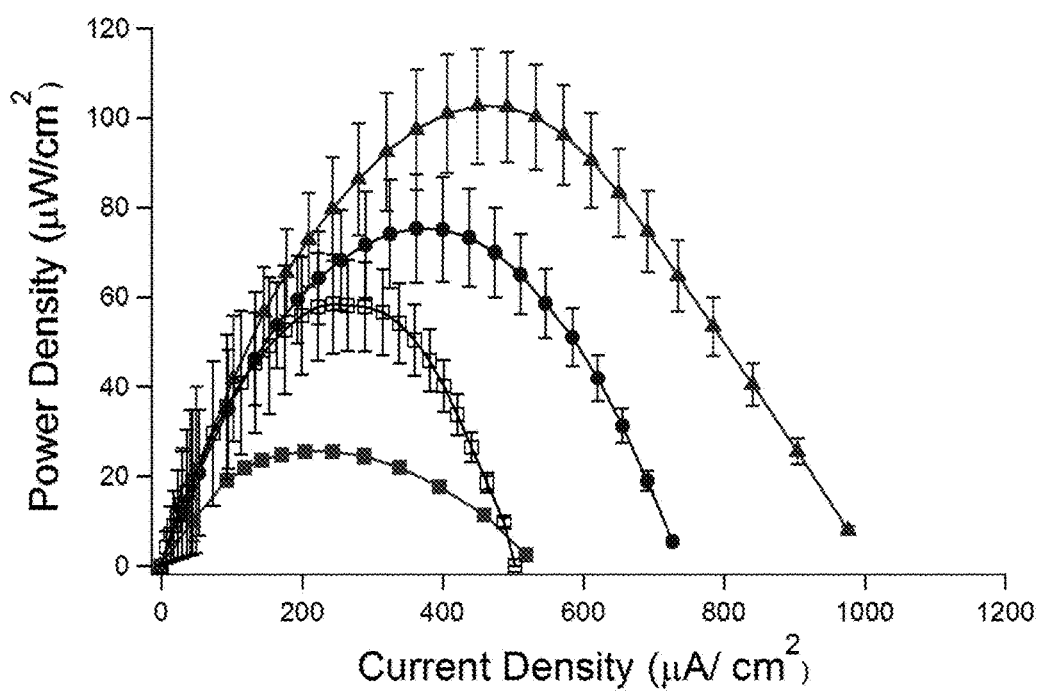
FIG. 20. I-P polarization curves for fuel cells with MEA anodes made of commercial catalyst (2.5 mg-Pt·cm$^{-2}$ loading) (■); OMC-4BP-PtCl$_2$ (0.1 mg-Pt·cm$^{-2}$ loading) (□); Pt/AC-1 (0.1 mg-Pt·cm$^{-2}$ loading) (●); and Pt/AC-2 (0.1 mg-Pt·cm$^{-2}$ loading) (▲).

FIGS. 19 and 20 show polarization curves for direct methane PEMFCs tested with the two different Pt-based catalysts at the anode. A preferred direct-methane PEMFC resulted when Pt/AC catalysts were combined with an ionic liquid ionomer, such as [DEMA][TfO] or [Im][HTFSI]. For a high loading of Pt catalyst (2.5 mg-Pt·cm$^{-2}$) on the anode, the fuel cell produced a limiting current density and a maximum power density of approximately 518 µA·cm$^{-2}$ and 25.5 µW·cm$^{-2}$, respectively. On the other hand, for a low loading of Pt-based single-site molecular catalyst (OMC-4BP-PtCl$_2$, 0.1 mg-Pt·cm$^{-2}$) at the anode, the fuel cell produced a limiting current density of approximately 503 µA·cm$^{-2}$ and a maximum power density of 58.5 µW·cm$^{-2}$. Preparation of OMC-4BP-PtCl$_2$ is described at Joglekar et al. J. AM. Chem. Soc. 2016, 138, 116-125.

AC-1 and AC-2 electrocatalysts (which contained low loadings of 0.1 mg-Pt·cm$^{-2}$) performed even better than the prior art (commercial) fuel cell catalysts, as shown in FIGS. 19 and 20. The fuel cell using Pt/AC-1 supported catalyst in the anode MEA had a limiting current density of approximately 720 µA·cm$^{-2}$ and a maximum power density 75 µW·cm$^{-2}$. Although the open circuit voltage (OCV) was lower, maybe due to the higher methane activation loss (due to electrochemical reaction) compared to the Pt-based single-site molecular catalyst, the ohmic and transport resistances were significantly improved, likely due to the presence of proton conducting functional groups (phosphate and phosphonate) on the surface of the catalyst. A fuel cell with Pt/AC-2 supported catalyst had the highest performance with a limiting current density and a maximum power density that were almost double of that obtained from the Pt-based single-site molecular catalyst; reaching approximately 1000 µA·cm$^{-2}$ and 100 µW·cm$^{-2}$, respectively. This Pt/AC-2 supported catalyst (with its high surface area, primarily microporous structure for better water diffusion, and around 1.5 nm diameter Pt nanoparticles well dispersed on its surface) was the preferred catalyst tested for direct-methane PEMFC.

Figure 21:
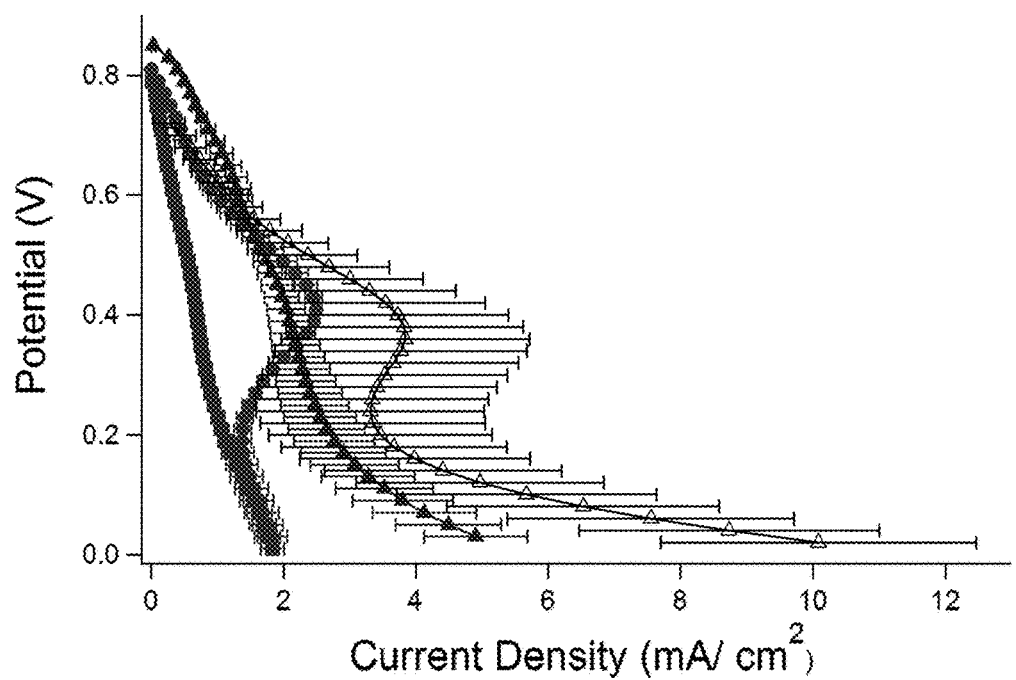
FIG. 21. Cell polarization curve for fuel cells with MEA anodes made of commercial Pt/C catalyst with 2.5 mg·cm$^{-2}$ Pt loading (●), Pt—Ru/C catalyst with 1.1 mg·cm$^{-2}$ Pt loading & 1.1 mg·cm$^{-2}$ Ru loading (■), molecular catalyst OMC-4BP-PtCl$_2$ with 0.1 mg·cm$^{-2}$ Pt loading (▲), and nitrogen/phosphorus doped carbon Pt/AC-2 with 0.1 mg·cm$^{-2}$ Pt loading (Δ).
Figure 22:
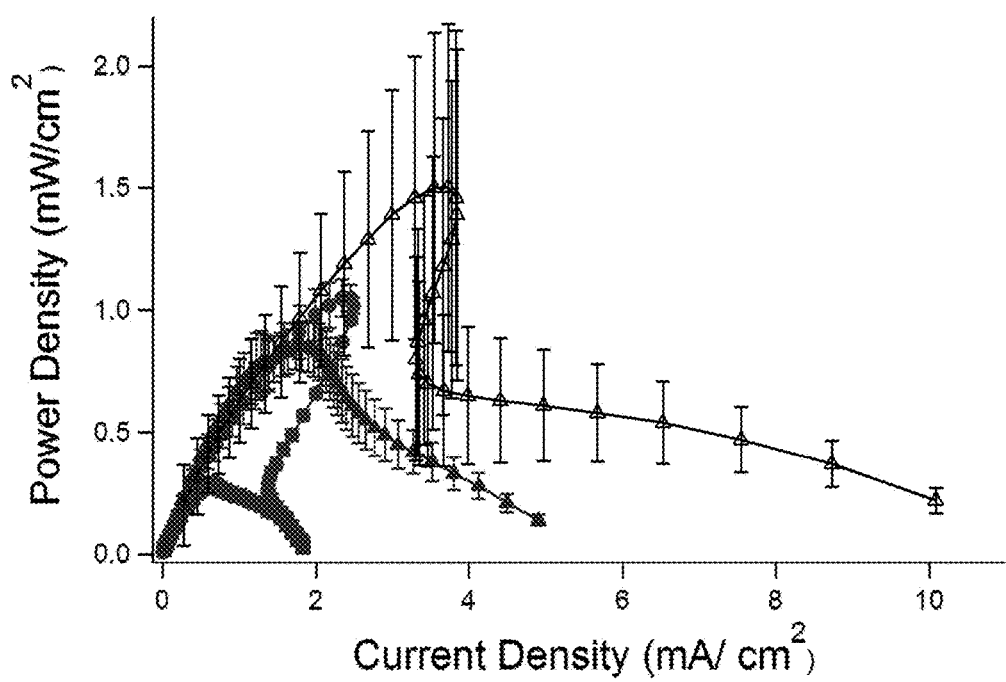
FIG. 22. Cell polarization curve for fuel cells with MEA anodes made of commercial Pt/C catalyst with 2.5 mg·cm$^{-2}$ Pt loading (●), Pt—Ru/C catalyst with 1.1 mg·cm$^{-2}$ Pt loading & 1.1 mg·cm$^{-2}$ Ru loading (■), molecular catalyst OMC-4BP-PtCl$_2$ with 0.1 mg·cm$^{-2}$ Pt loading (▲), and nitrogen/phosphorus doped carbon Pt/AC-2 with 0.1 mg·cm$^{-2}$ Pt loading (Δ).

Since both Pt-based single-site molecular catalyst (OMC-4BP-PtCl$_2$)$^2$ and Pt-based nitrogen/phosphorus doped carbon catalyst (Pt/AC-2) performed well in direct-methane PEMFCs at 80° C., they were also tested at 160° C. Commercial Pt/C and Pt—Ru/C catalysts were used as references to establish baseline performance. FIGS. 21, and 22 show the polarization curves of direct-methane PEMFCs using the aforementioned catalysts. As shown, both commercial Pt/C and Pt/AC-2 have a curving shape at 0.4 V, which was suspected to be related to carbon monoxide formation. However, at low voltage, the poisoning sites became clean, especially in the case of Pt/AC-2, and fuel cell performance resumed. One important observation during this study is that carbon monoxide poisoning was completely absent for the Pt—Ru/C and OMC-4BP-PtCl$_2$ catalysts. Pt/Ru alloy is known for its carbon monoxide tolerance, mainly because the dissociation of water on ruthenium leads to a further oxidation of carbon monoxide to carbon dioxide.

The OCVs of all the fuel cells tested were above 0.8 V, stable, and reproducible. The fuel cell with Pt/AC-2 had the highest current density and power density. Although not wishing to be bound by theory, this is likely because Pt/AC-2 has more Pt active sites due to its higher Pt dispersion with smaller particle size. This is the first time that a direct-methane PEMFC has been shown to be capable of generating more than 10 mA·cm$^{-2}$ and 1.5 mW·cm$^{-2}$ (at 160° C.). The fuel cell with OMC-4BP-PtCl$_2$ catalyst was the next best in terms of limiting current density (5.0 mA·cm$^{-2}$) and maximum power density (0.85 mW·cm$^{-2}$). Fuel cells with either Pt/C or Pt—Ru/C had the same limiting current density (2.0 mA·cm$^{-2}$), however Pt/C had higher maximum power density (1.05 mW·cm$^{-2}$) compared to Pt—Ru/C (0.29 mW·cm$^{-2}$), probably due to its higher Pt loading.

Figure 23:
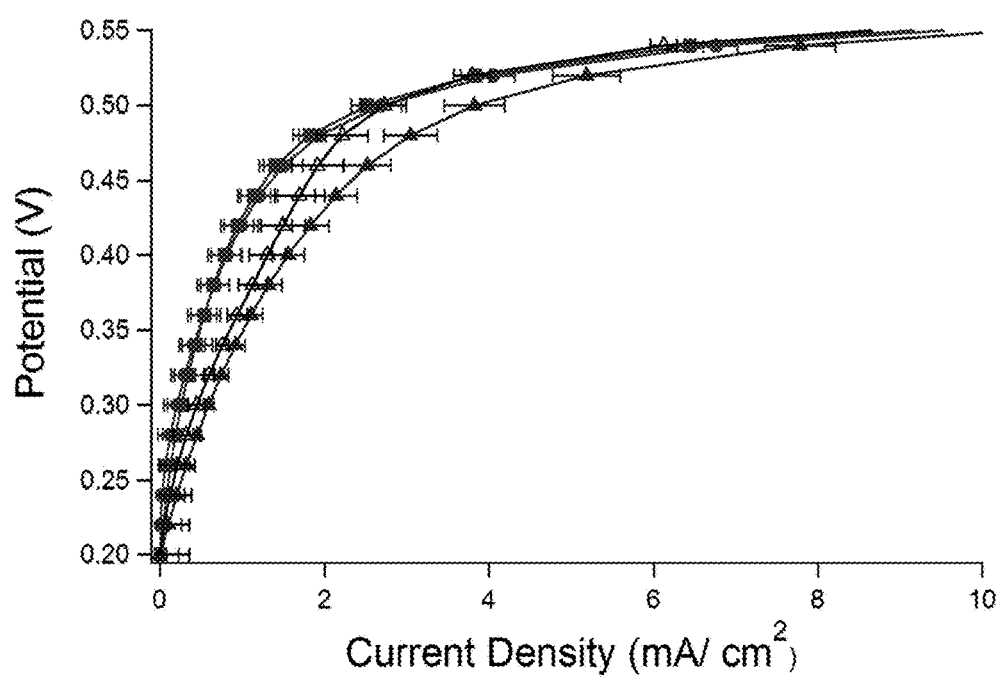
FIG. 23. Anode polarization curve for fuel cells with MEA anodes made of commercial Pt/C catalyst with 2.5 mg·cm$^{-2}$ Pt loading (●), Pt—Ru/C catalyst with 1.1 mg·cm$^{-2}$ Pt loading & 1.1 mg·cm$^{-2}$ Ru loading (■), molecular catalyst OMC-4BP-PtCl$_2$ with 0.1 mg·cm$^{-2}$ Pt loading (▲), and nitrogen/phosphorus doped carbon Pt/AC-2 with 0.1 mg·cm$^{-2}$ Pt loading (Δ).
Figure 24:
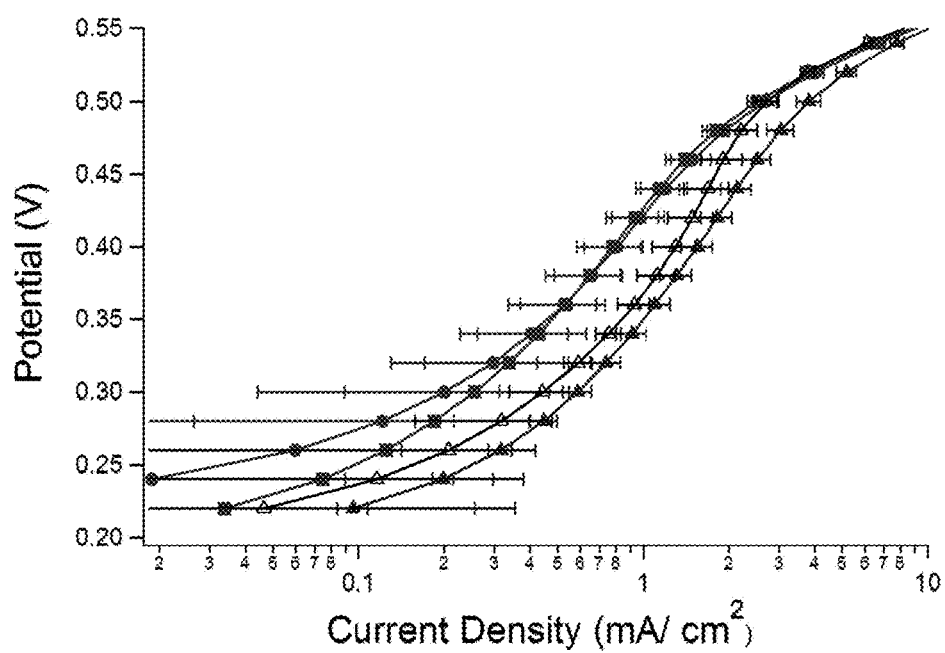
FIG. 24. Anode polarization curves (bottom) for fuel cells with MEA anodes made of commercial Pt/C catalyst with 2.5 mg·cm$^{-2}$ Pt loading (●), Pt—Ru/C catalyst with 1.1 mg·cm$^{-2}$ Pt loading & 1.1 mg·cm$^{-2}$ Ru loading (■), molecular catalyst OMC-4BP-PtCl$_2$ with 0.1 mg·cm$^{-2}$ Pt loading (▲), and nitrogen/phosphorus doped carbon Pt/AC-2 with 0.1 mg·cm$^{-2}$ Pt loading (Δ).

FIGS. 23, and 24 show the anode polarization curves for these four fuel cell catalysts. It shows the curves under log scale for a more descriptive view. As indicated by the curves, the Tafel slopes for the OMC-4BP-PtCl$_2$ and Pt/AC-2 catalysts are about the same (182-183 mV·dec$^{-1}$), whereas the Tafel slopes for the Pt/C and Pt—Ru/C catalysts are larger; about 193 mV·dec$^{-1}$ and 227 mV·dec$^{-1}$, respectively. The anode polarization results indicate that OMC-4BP-PtCl$_2$ and Pt/AC-2 both have higher methane oxidation reaction activity with faster reaction kinetics than the commercial catalysts.

Figure 25:
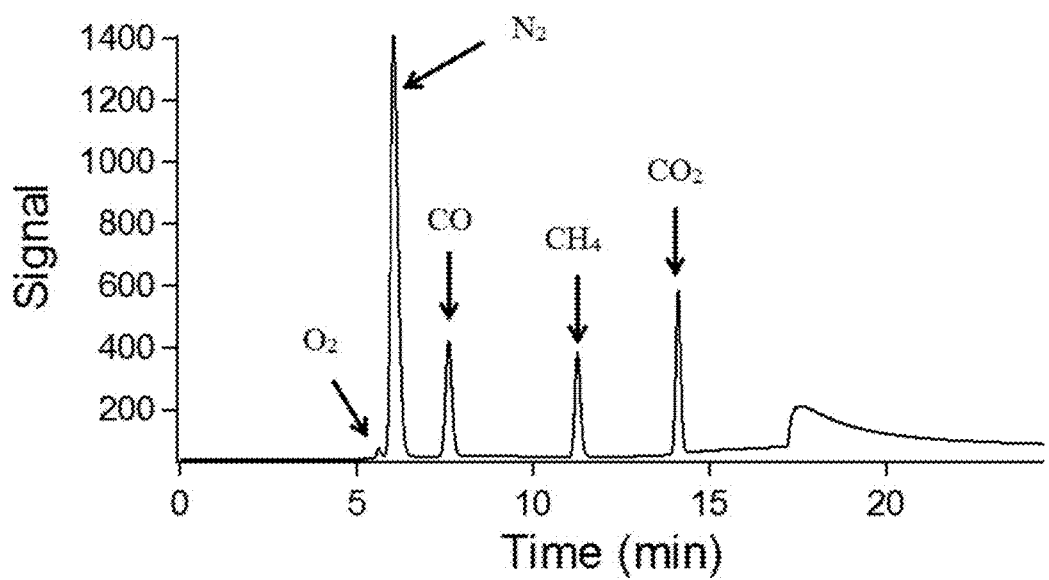
FIG. 25. GC chromatogram of gas standards at 5 volume % each in nitrogen.
Figure 26:
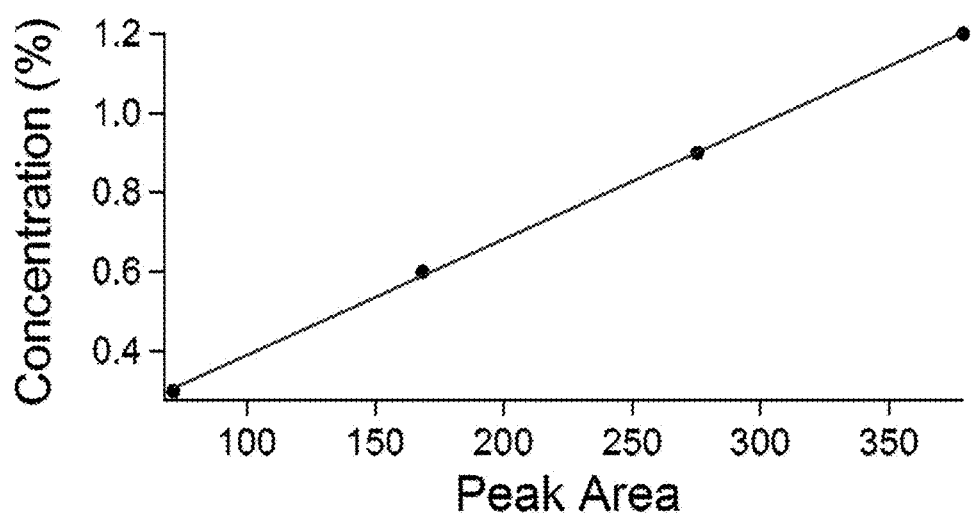
FIG. 26. Carbon monoxide calibration curve.
Figure 27:
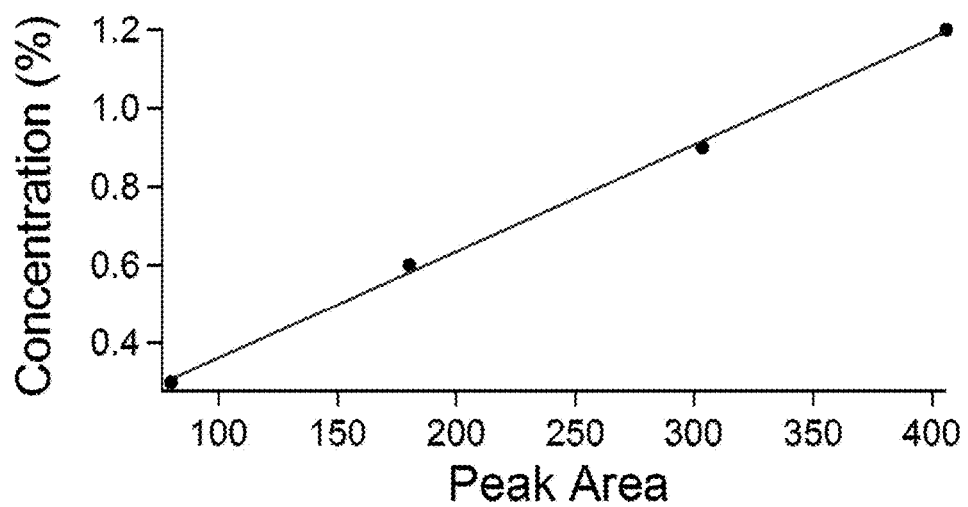
FIG. 27. Carbon dioxide calibration curve.
Figure 28:
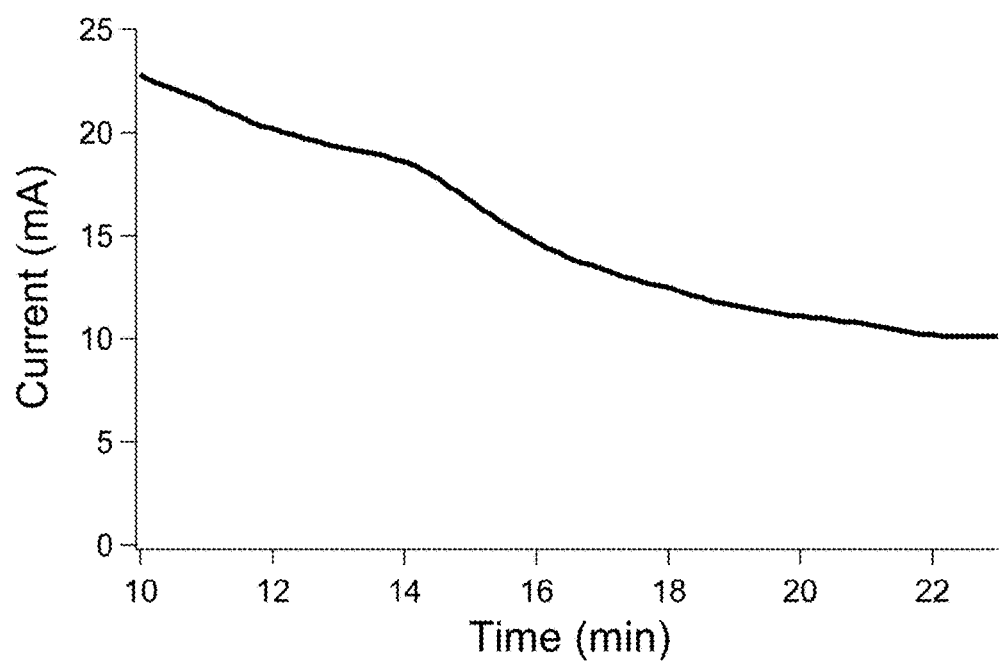
FIG. 28. Direct-methane PEMFC with "AC-2" at the anode showing the current produced during chronoamperometry at 0.2 V.

To confirm that methane oxidation was occurring at the anode, a chronoamperometry sequence at 0.2 V was applied on the fuel cell using Pt/AC-2 (with a 25 cm$^2$ MEA for higher current density). After at least 15 minutes had passed, the methane feed was reduced to 90% of its original flowrate, subsequently increasing the product concentrations above the detectable limits of the TCD and FID detectors. A series of carbon monoxide and carbon dioxide gas standards were prepared and used for calibrations. FIG. 25 shows the standards' TCD signals with the typical gas retention times. According to this pattern, carbon monoxide and carbon dioxide should be detected at approximately 7.6 minutes and 14.2 minutes, respectively. FIGS. 26 and 27 show two typical calibration curves for CO and CO$_2$ at a concentration range of 0.3-1.2 vol. %, which is close to their expected concentrations in the anode exhaust. Both calibration curves were linearized with greater than 99% correlation, indicating that they may be used for estimating CO and CO$_2$ product concentrations with reasonable precision.

Figure 29:
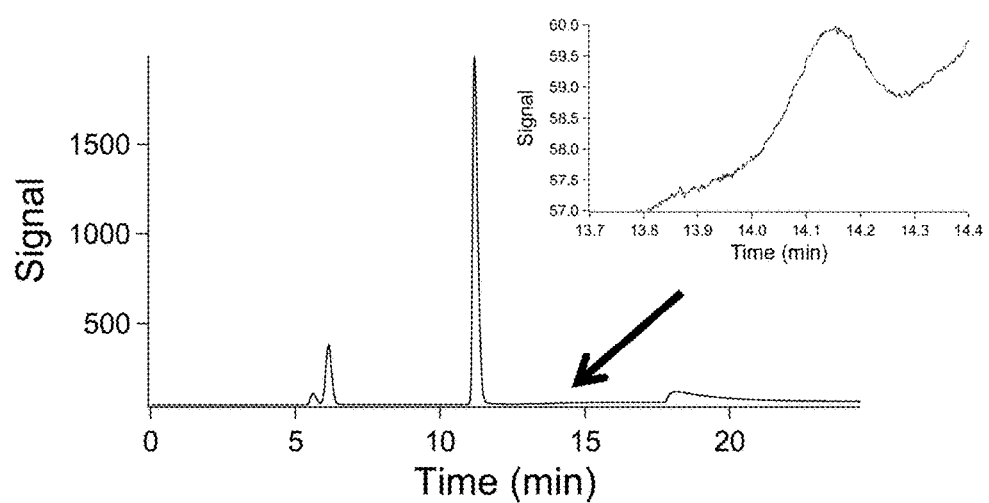
FIG. 29 Direct-methane PEMFC with "AC-2" at the anode GC chromatogram for the exhaust gas (right).

After 15 minutes of continuously holding at 0.2 V, the fuel cell produced an average of 15±2.1 mA, which corresponds to 0.16±0.022% conversion according to Faraday's law. The exhaust was then collected and analyzed by GC. As expected, CO$_2$ was the only byproduct that appeared in the gas sample. FIG. 29 clearly shows the CO$_2$ peak at a 14.2 minutes retention time. About 0.13±0.013% CO$_2$ formed as estimated from the calibration curve. No methanol was detected by the FID detector.

The Nitrogen/phosphorus doped carbon supports of the present invention have a critical surface area and tunable pore size distribution, which improved Pt dispersion, proton conduction, and water diffusion at the direct-methane PEMFC anode. The functional groups that appeared on the surface were predominately pyridine, pyrrole, pyridone, phosphate, and phosphonates at the carbon edge sites. These functional groups provided ligands that tightly bound and anchored the highly dispersed Pt nanoparticles, as shown in both XRD and TEM.

With low Pt loadings of approximately 0.1 mg-Pt·cm$^{-2}$, the electrocatalysts of the present invention produced superior currents and power densities compared to the previous best known catalysts. A fuel cell that contained Pt/AC-1 supported catalyst had a limiting current density of approximately 720 µA·cm$^{-2}$ and a maximum power density 75 µW·cm$^{-2}$, but even better, a fuel cell that contained Pt/AC-2 supported catalyst showed almost double the performance of obtained from the Pt-based single-site molecular catalyst, reaching approximately 1000 µA·cm$^{-2}$ and 100 µW·cm$^{-2}$ (at 80° C.). The results of fuel cell testing at 160° C. showed that the fuel cell with Pt/AC-2 had the highest limiting current density (10 mA·cm$^{-2}$) and the highest maximum power density (1.5 mW·cm$^{-2}$) for any tested direct-methane PEMFCs below 200° C. The anode polarization results also indicated that the OMC-4BP-PtCl$_2$ and Pt/AC-2 catalysts had higher methane oxidation reaction activity with faster reaction kinetics than the commercial catalysts. Most importantly, CO$_2$ was the only product detected in the fuel cell exhaust by GC analysis, which proved that methane was indeed oxidized during fuel cell operation.

The present invention teaches the new carbon-platinum electrolcatalysts and their use in superior-performance fuel cells and electrolyzers. The present invention also teaches a doped polybenzimidazole proton exchange membrane capable of operation in a fuel cell above 100° C. Although the present invention has been described in considerable detail with reference to certain preferred versions thereof, other versions are possible. Therefore, the spirit and scope of the appended claims should not be limited to the description of the preferred versions contained herein, except where required by 35 U.S.C.§ 112 ¶ 6 or 35 U.S.C.§ 112 (f).

The reader's attention is directed to all references which are filed concurrently with this specification and which are incorporated herein by reference.

All the features in this specification (including any accompanying claims, abstract, and drawings) may be replaced by alternative features serving the same, equivalent or similar purpose, unless expressly stated otherwise. Thus, unless expressly stated otherwise, each feature disclosed in one example only of a generic series of equivalent of similar features. Any element in a claim that does not explicitly state "means for" performing a specified function, or "step for" performing a specific function, is not to be interpreted as a "means" or "step" clause as specified in 35 U.S.C.§ 112 ¶ 6 or 35 U.S.C.§ 112 (f). Any element in a claim that does explicitly state "means for" performing a specified function, or "step for" performing a specific function, is to be interpreted as a "means" or "step" clause as specified in 35 U.S.C.§ 112 ¶ 6 or 35 U.S.C.§ 112 (f).

What is claimed is:

1. A platinum-carbon electrocatalyst material comprising:
   (a) a carbon support having a minimum BET surface area of 1000 $m^2/g$;
   (b) a nitrogen content of at least 2.5 weight percent, which is present in the form of pyridine, pyridone or pyrrole;
   (c) a phosphorous content of at least 3 weight percent, which is present in the form of phosphate and phosphonate; and
   (d) a plurality of platinum nanoparticles dispersed on the carbon support having a maximum average particle diameter of 1.5 nm.

2. The platinum-carbon electrocatalyst material of claim 1 further comprising: a DFT micropore volume from 0.3 to 0.45.

3. The platinum-carbon electrocatalyst material of claim 1 further comprising: pore widths from 1 to 100 nm.

4. The platinum-carbon electrocatalyst material of claim 3 further comprising: pore widths from 2 to 50 nm.

5. The platinum-carbon electrocatalyst material of claim 3 further comprising: pore widths in a range from 1 to 5 nm.

6. The platinum-carbon electrocatalyst material of claim 1 further comprising: a minimum BET surface area of 1400 $m^2/g$.

7. A method of making a platinum-carbon electrocatalyst material comprising a carbon support having a minimum BET surface area of 1000 $m^2/g$; a nitrogen content of at least 2.5 weight percent, which is present in the form of pyridine, pyridone or pyrrole; a phosphorous content of at least 3 weight percent, which is present in the form of phosphate and phosphonate; and a plurality of platinum nanoparticles dispersed on the carbon support having a maximum average particle diameter of 1.5 nm, wherein the method comprises the steps of:
   (a) providing a carbon support material having a minimum BET surface area of 1000 $m^2/g$, a nitrogen content of at least 2.5 weight percent, which is present in the form of pyridine, pyridone or pyrrole; a phosphorous content of at least 3 weight percent, which is present in the form of phosphate and phosphonate; and
   (b) depositing platinum nanoparticles with a maximum average diameter of 1.5 nm onto the carbon support material using an in situ vapor-phase dissociative process.

* * * * *